US008929931B1

(12) United States Patent
Goldberg et al.

(10) Patent No.: US 8,929,931 B1
(45) Date of Patent: Jan. 6, 2015

(54) RESOURCE INSTALLATION MANAGEMENT IN A WIRELESS NETWORK

(75) Inventors: Bryan Goldberg, Vienna, VA (US); John Kim, Centreville, VA (US); Praveen Srivastava, Ashburn, VA (US); Ahmed Bencheikh, Fairfax Station, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 83 days.

(21) Appl. No.: 13/281,308

(22) Filed: Oct. 25, 2011

(51) Int. Cl.
  H04W 40/00   (2009.01)
  H04W 16/20   (2009.01)
  H04W 16/18   (2009.01)
  H04W 16/30   (2009.01)

(52) U.S. Cl.
  CPC .............. H04W 16/20 (2013.01); H04W 16/18 (2013.01); H04W 16/30 (2013.01)
  USPC ........... 455/466; 455/447; 455/448; 455/449; 455/422.1

(58) Field of Classification Search
  CPC ..... H04W 16/18; H04W 16/20; H04W 16/32; H04W 16/26; H04W 16/24; H04W 16/30
  USPC ............. 455/423, 115.1, 456.1, 456.2, 456.3, 455/456.4, 456.5, 456.6, 457, 446, 447, 455/448, 449, 422.1
  See application file for complete search history.

(56) References Cited

U.S. PATENT DOCUMENTS

| | | | | |
|---|---|---|---|---|
| 7,096,173 | B1* | 8/2006 | Rappaport et al. | 703/13 |
| 7,970,408 | B2* | 6/2011 | Vacon et al. | 455/446 |
| 8,385,900 | B2* | 2/2013 | Trigui | 455/418 |
| 2004/0102192 | A1* | 5/2004 | Serceki | 455/434 |
| 2004/0142699 | A1* | 7/2004 | Jollota et al. | 455/452.2 |
| 2005/0090263 | A1* | 4/2005 | Ebata | 455/453 |
| 2005/0186972 | A1* | 8/2005 | Ogino et al. | 455/457 |
| 2006/0019679 | A1* | 1/2006 | Rappaport et al. | 455/456.5 |
| 2006/0128372 | A1* | 6/2006 | Gazzola | 455/424 |
| 2007/0197207 | A1* | 8/2007 | Carstens et al. | 455/423 |
| 2008/0075051 | A1* | 3/2008 | Dundar et al. | 370/338 |
| 2010/0124886 | A1* | 5/2010 | Fordham et al. | 455/67.11 |
| 2010/0157911 | A1* | 6/2010 | Hegde et al. | 370/329 |
| 2011/0044206 | A1* | 2/2011 | Kalika et al. | 370/254 |
| 2011/0244892 | A1* | 10/2011 | MacManus et al. | 455/457 |
| 2012/0165027 | A1* | 6/2012 | Kim et al. | 455/446 |
| 2013/0143549 | A1* | 6/2013 | Reudink | 455/423 |

* cited by examiner

*Primary Examiner* — Khai M Nguyen
(74) *Attorney, Agent, or Firm* — Chapin IP Law, LLC

(57) ABSTRACT

A graphical user interface displays a proposed site plan of one or more new base stations with respect to existing network infrastructure in a geographical region. While in the field, an installation specialist can perform an in-person survey of the geographical region to determine whether a proposed location is suitable for installation of a wireless base station. The installation specialist may identify an obstacle that would inhibit a newly proposed wireless base station from providing desired coverage if installed at the proposed location. Via input to the graphical user interface, the installation specialist proposes an alternative location in which to install the new base station. A processor performs a validity check and provides feedback indicating whether installation of the new base station at the alternative location is acceptable. The graphical user interface also can support collection of site survey data to monitor progress of the installation.

43 Claims, 17 Drawing Sheets

RESOURCE INSTALLATION MANAGEMENT IN A WIRELESS NETWORK

BACKGROUND

Conventional RF (Radio Frequency) technology has been used for many years to connect wireless devices such as phones, laptops, etc., to a landline network and other wireless networks. Today, such networks support many different types of connection services such as voice communications, high-speed data services, WI-FI connectivity, and so on.

Conventional cellular networks typically include a land area that has been divided into so-called cellular regions. A single base station typically resides in each cell. Often, the base station is connected to a landline network and supports communication with one or more wireless subscribers operating in a region covered by the cell. Accordingly, a wireless subscriber operating a cell phone in the cell is able to communicate with or have access to a landline network via a wireless link between the subscriber and a base station.

Conventional long-range cellular networks sometimes do not have the ability to provide connectivity to users at every location in a geographical region. One reason for this shortcoming is the high cost associated with designing and subsequently implementing a long-range cell tower for every portion of a geographical region. In many instances, a cell tower providing long-range coverage requires a long-term financial commitment. In certain instances, because costs are so high, a service provider may not even install a cell tower because it is not a good investment.

More recent wireless technology includes so-called pico base stations or wi-fi stations having the ability to provide short-range coverage compared to long-range coverage provided by conventional cell towers. The short-range base stations have the ability to provide coverage in locations that were not previously possible. As an example, a pico base station may provide radial coverage on the order of 200-300 meters. A long-range base station or conventional cell tower may provide wireless coverage on the order of a mile or more. Because of cost concerns and higher re-usage of frequencies in the RF spectrum, it is now becoming more common to implement one or more pico base stations to provide additional wireless coverage in a region. Small cell base station deployment may increase the number of cells in a given area, and thereby, improve the overall network capacity without adding more RF spectrums. In certain cases, a short-range base station can be mounted to existing infrastructure (e.g., a cable), alleviating the costs associated with having to design and erect a dedicated tower.

BRIEF DESCRIPTION OF EMBODIMENTS

Conventional techniques for installing wireless communication systems suffer from a number of deficiencies, especially small cell network installations. For example, installation of conventional communication systems including one or more wireless base station typically requires a detailed system analysis to determine how many wireless base stations will be needed to support desired coverage in a geographical region. Because there are so many parameters to consider, the analysis may be quite complex and time-consuming. Based on the analysis, a designer creates a so-called site plan. The site plan indicates, based on a best guess, where to install each of multiple wireless base stations in order to provide the desired wireless coverage in an area.

There are often cases in which the initial site plan must be modified as a result of unexpected obstacles discovered in the field. It is not the designer's fault since the designer creating the site plan typically is not aware of the obstacles during the design.

For example, an installation specialist may learn in the field that installation of one or more wireless base stations in accordance with the proposed site may not be feasible because one or more RF-blocking obstacles may be in the way. Even if a wireless base station can be installed in a proposed location, it is possible that an object such as a tree may obstruct an RF path between the wireless base station and one or more target users in a geographical region.

According to conventional techniques, in such an instance, the installer would notify the designer back in a main office of the issues associated with installation. The designer would then be required to modify the site plan to account for one or more obstructions or installation issues that arise in the field. The designer would typically be required to run heavy computations again, taking into account the obstacles and potentially other input, to determine whether an alternative site is an acceptable location in which to alternatively install the wireless base station and provide the desired coverage. On completion, the designer forwards the modified site plan to the installation specialist.

Upon receipt of the updated site plan, the installer is then able to install the wireless base stations in the appropriate locations as specified by the designer. In certain cases, the installation specialist may discover yet more obstacles that are not known to the designer. In such an instance, the installation specialist then forwards the new obstacle information to the designer. This back and forth process between the installation specialist and the designer is typically costly and time-consuming because an installation may require many iterations of notifying the designer in the office of installation issues.

Embodiments herein deviate with respect to conventional applications. For example, embodiments herein are directed to unique ways of facilitating installation of one or more resources such as wireless base stations in a wireless network environment. In one embodiment, an installation specialist utilizes a portable installation management tool to more quickly and efficiently install one or more wireless base station in a communication network. Additionally, in another embodiment, the portable computer executing the installation manager collects field information and forwards the information to a central repository that keeps track of a deployment status of a wireless network site plan including one or more base stations.

The portable computer executing the installation manager may enable the installation specialist to more quickly resolve installation issues. For example, in one embodiment, the portable installation management tool supports in the field computations enabling a respective installation specialist to more quickly determine valid, alternative locations in which one or more base stations can be installed.

More specifically, in accordance with one embodiment, an installation specialist executes an installation manager on a computer device. The installation manager is configured to control and display a graphical user interface. In one embodiment, the graphical user interface displays a proposed site plan on a display screen of the computer device. The proposed site plan displayed on the display screen specifies: i) a proposed location to install a wireless base station in a corresponding geographical region, and ii) a prediction of wireless coverage provided by the wireless base station in the proposed location. Accordingly, the installation specialist is apprised of at least an approximate location or acceptable areas in which to install a wireless base station in a geographical region.

While in the field, the installation manager can perform an in-person survey of the geographical region to determine whether the proposed location or areas are suitable for installation of the wireless base station. Assume, in this example, during installation, that the installation specialist identifies an RF-blocking or RF-interfering obstacle such as an object that would inhibit the wireless base station from providing the predicted coverage if installed at the proposed location in the site plan. In other words, assume that the installation technician in the field identifies that installation of the wireless base station in the proposed location will not provide the desired or expected coverage as specified in the proposed site plan. The installation of the wireless base station at the proposed location may be impracticable due to, for example, presence of the obstacle in a vicinity of the proposed location.

In accordance with further embodiments, to facilitate installation, the installation manager in the portable computer overlays a map of existing resources in a network infrastructure onto the proposed site plan (or vise versa) for simultaneous viewing of both the network infrastructure and the proposed site plan on a respective display screen. The network infrastructure indicates a location of and availability of resources in which to mount the one or more wireless base stations as specified by the proposed site plan.

As specified by the proposed site plan, for each new wireless base station to be added to the network, the graphical user interface provides an indication of a respective location of a resource or resources in the network infrastructure in which to attach the wireless base station at the proposed location. Accordingly, via the graphical user interface, the installation specialist is able to easily identify proposed locations in which each of the new wireless base stations is to be installed or mounted with respect to existing network infrastructure.

During the installation, the installation specialist can provide input to the installation manager application executed on the computer. In one embodiment, by way of a non-limiting example, the input can be feedback from the installation technician viewing the display screen. The installation technical performs an in-person survey of the proposed location. In such an instance, to avoid one or more identified obstacles, impediments, etc., in the geographical region, the installation specialist (or other suitable resource such as the installation manager executing on the computer) can propose installing the wireless base station at an alternative location in the geographical region rather than at the originally proposed location as specified by the proposed site plan.

In one embodiment, the installation manager executed on the computer device receives input proposing installation of the wireless base station in the alternative location with respect to the initially proposed location. For example, in one embodiment, the installation specialist can mark a location on the display screen indicating an alternative location in which to potentially install the wireless base station. In response to receiving the input, the installation manager then updates the graphical user interface on the display screen to display an updated proposed site plan. In one embodiment, the installation manager initiates execution of a respective algorithm to determine whether the alternative site proposed by the installation specialist is acceptable. The installation manager then displays the updated site plan.

In yet further embodiments, the updated site plan can specify: i) the alternative location in the geographical region, and ii) a prediction of wireless coverage provided by the wireless base station in the alternative location. Accordingly, based on guidance provided by the graphical user interface, an installation specialist in the field can easily determine whether an alternative location (as provided by a installation specialist or other resource) is suitable for installation of the wireless base station in the alternative location.

The installation specialist can view specific details of network infrastructure resources available at multiple possible alternative locations in the geographical region and decide, based on available resources, which of the possible locations is suitable for installation of the wireless base station.

In accordance with further embodiments, the graphical user interface can initiate display of a visual indication on the display screen to indicate whether the alternative location in the network infrastructure is a valid option to operate the wireless base station. By way of a non-limiting example, the visual indication can be a text message indicating that the alternative location, as proposed by the installation specialist in the field, is a valid location in which to install the wireless base station.

The graphical user interface is thus an installation guide used by the installation specialist.

It is possible that the installation of the wireless base station at the alternative location will not provide the same wireless coverage as the originally predicted wireless coverage if the wireless base station were installed at the originally proposed location. In such an instance, the updated display screen can indicate the difference in coverage between coverage provided by installation of the wireless base station at the originally proposed location and installation of the wireless base station at the alternative location. Accordingly, the installation specialist can identify a difference in the wireless coverage depending on where the base station is installed.

The installation specialist can view the display screen to identify one or more null regions in which neither the wireless base station at the alternative location nor do any other resources in the network provide wireless coverage as anticipated by installing the wireless base station at the originally proposed location.

The installation manager application as discussed herein can be configured to provide a visual indication of one or more resources (such as a house, building, etc.) in the vicinity of the proposed location that must have access to the RF service provided by the newly installed base station. Accordingly, the installation specialist can determine a most suitable alternative location for installing the base station assuming that installation of the base station in the originally proposed location is impracticable. Displaying coverage from the base station in the alternative location enables the installation specialist to determine whether the location is suitable for providing coverage to the house, building, etc.

In one embodiment, to view a difference in coverage between the coverage expected by installing the wireless base station at the proposed location and the alternative location, embodiments herein can include initiating simultaneous display of the prediction of wireless coverage provided by the wireless base station in the alternative location with respect to the prediction of wireless coverage provided by the wireless base station in the originally proposed location. Accordingly, an installation specialist can easily identify whether installation of the wireless base station in the alternative location would be an acceptable solution to avoiding the obstacle and providing appropriate wireless coverage.

In further embodiments, the graphical user interface can be configured to display coverage provided by different types of base stations. For example, the graphical user interface can display coverage provided by long-range base stations, short-range base stations, etc. The graphical user interface can provide a visual indication of a portion of the geographical region having no wireless coverage by any base station as a result of installing the wireless base station in the alternative location instead of the proposed location. Accordingly, the installation specialist can identify whether a respective wireless network (other than the new base station) will provide wireless coverage to a particular coordinate of interest such as a building, household, etc.

In accordance with yet another embodiment, the graphical user interface can be configured to initiate display of an overlay indicating wireless coverage provided by a set of one or more long-range base stations operated by a wireless network service provider in the geographical region. The wireless base station as specified by a site plan can be a short-range base station to fill in dead zones between the long-range base stations. Additionally, small cell base stations (e.g., short-range base stations) can also be deployed to address wireless carriers capacity problems. For example, small cell base stations can be deployed into existing coverage areas to boost wireless capacity in the respective area. The graphical user interface as discussed herein can be configured to provide a visual indication of the prediction of wireless coverage provided by the wireless base station at the proposed location in relation to coverage provided by the one or more long-range base stations operated by network service provider.

Via input form a source such as the installation specialist, the installation manager application can be apprised of a location information indicating a location of at least one obstacle in a vicinity of the proposed location. For example, the technician installing the wireless base station can provide the information about the obstacle based on an in-person survey of the proposed location. The obstacle can be a tree, building, etc., that unexpectedly blocks or generally affects the RF coverage provided by the new base station.

In one embodiment, based on one or more identified obstacles in a region, the graphical user interface and respective installation manager tool can be configured to generate a realistic RF coverage pattern in a region taking into account presence of one or more newly identified obstacles in a region.

For example, a user can input (to the graphical user interface) details of one or more obstacles as identified in an in-person field survey. A processing resource associated with the graphical user interface computes the actual coverage of the base station in a region taking into account the newly identified obstacles. More specifically, in one embodiment, the graphical user interface displays the computed actual coverage of the base station taking into account blockage, interference, etc., that is theoretically caused by the newly identified objects, environmental conditions, etc., that have an affect on the wireless coverage provided by the base station. Display of the computed RF coverage, taking into account reflections, interference, etc., of the obstacles, alleviates the user from having to guess in the field as to what affect the one or more obstacles will have on RF coverage. Instead, the processing resource produces a more accurate theoretical prediction of RF coverage for viewing by the user.

The installation manager application can be configured to perform calculations to independently determine, while taking into account one or more obstacles identified by the installation specialist, alternative locations in which to install one or more wireless base stations in different locations in the geographical region. The graphical user interface displays the alternative locations on the display screen for viewing by the installation specialist. Accordingly, the installation specialist can be apprised of suitable alternative locations in which to install one or more base stations to avoid the obstacles. Thus, the computer can perform the complex processing to determine whether a site proposed by the installation specialist is acceptable.

By way of a further non-limiting example, the installation manager application as discussed herein can facilitate identification of an alternative location in which to install a respective one or more base stations. For example, in one embodiment, the installation manager application can receive a command applied to the wireless base station in the proposed site plan displayed on the display screen. The command can indicate the desire, by the installation specialist, for the installation manager application to identify one or more alternative locations in which to mount the wireless base station.

In response to receiving the command, the installation manager application identifies resources required to operate the wireless base station according to a predetermined performance level. For example, the wireless base station may be required to support a certain data bandwidth, the wireless base station may consume a certain amount of power, etc. The installation manager can have access to information indicating the ability of different locations of the network infrastructure that provide appropriate data bandwidth, power availability, etc. Based on this information, the installation manager (and/or processing functionality at a remote location with respect to the portable device operated by the installation specialist) processes the information to identify alternative locations of the network infrastructure in a vicinity of the proposed location that have an ability to support the wireless base station in accordance with the required resources.

The installation manager application then updates the graphical user interface to provide a visual indication specifying one or more acceptable alternative locations of the network infrastructure having the ability to support wireless base station in accordance with the operational parameters.

By further way of a non-limiting example, the visual indication of alternatively locations to which the wireless base station can be mounted can represent a continuum of a physical cable resource of the network infrastructure. The installation specialist can selectively mount the wireless base station to any point on the continuum.

In one embodiment, the continuum of the physical cable resource can include a communication link on which to convey data to and from the wireless base station. A power supply resource in the continuum of the physical cable resource can be tapped to provide power to the wireless base station when so mounted.

In accordance with yet further embodiments, the user of the portable computer device executing the installation manager can perform an operation such as dragging and dropping a symbol of a selected base station on the display screen to a new location. In response to this input (or other type of selection), the installation manager application identifies operational parameters (e.g., required power, required data bandwidth, etc.) associated with the wireless base station. Based on the operational parameters, the installation manager application performs an analysis to determine whether installation of the wireless base station at a candidate alternative location with respect to the network infrastructure has the ability to support operation of the wireless base station in accordance with the operational parameters.

Accordingly, the installation specialist can propose a new location in which to install a wireless base station. Based on calculations and knowledge of the network infrastructure resources available at the new location, the installation manager application makes a determination of whether the alternative location can support the wireless base station and provide required performance. Accordingly, the installation specialist can propose the alternative location in which to install the base station; the installation manager executing on the computer provides feedback indicating whether appropriate resources are available to support the performance required by the base station.

These and other more specific embodiments are disclosed in more detail below.

Note that embodiments herein can include a configuration of one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

For example, one embodiment includes a computer readable storage medium or computer readable hardware medium having instructions stored thereon to facilitate installation of one or more base stations in a wireless network environment; the instructions, when executed by a processor of a respective computer device, cause the processor or multiple processors to: initiate display of a proposed site plan on a display screen, the proposed site plan specifying: i) a proposed location to install a wireless base station in a geographical region, and ii) a prediction of wireless coverage provided by the wireless base station in the proposed location; during installation of the wireless base station, receiving input proposing installation of the wireless base station in an alternative location with respect to the proposed location; and in response to receiving the input, updating the proposed site plan on the display screen, the updated proposed site plan specifying: i) the alternative location in the geographical region, and ii) a prediction of wireless coverage provided by the wireless base station in the alternative location.

Yet another embodiments herein includes a computer readable storage medium having instructions stored thereon to facilitate installation of one or more base stations in a wireless network environment. The instructions, when executed by a processor of a respective computer device, cause the processor or multiple processors to: initiate display of a network infrastructure on a display screen; on the display screen, overlay a display of a proposed wireless network site plan with respect to the network infrastructure, the proposed wireless network site plan specifying a proposed location in which to install a wireless base station; provide an indication of a location of at least one resource in the network infrastructure in which to mount the wireless base station to provide a desired wireless coverage; from a user installing the wireless base station, receive input proposing installation of the wireless base station at an alternative location with respect to the proposed location; and update a deployment status of the proposed site plan on the display screen to indicate installation of the wireless base station at the alternative location.

Yet another embodiments herein includes a computer readable storage medium having instructions stored thereon to facilitate installation of one or more base stations in a wireless network environment. The instructions, when executed by a processor of a respective computer device, cause the processor or multiple processors to: initiate display of a proposed site plan on a display screen, the proposed site plan specifying a proposed location to install a wireless base station in a geographical region; during physical installation of the wireless base station in the geographical region, receive input with respect to the proposed site plan on the display screen, the input indicating a presence and location of at least one obstacle in the geographical region in a vicinity of the proposed location; in response to receiving the input, identify an alternative location in which to install the wireless base station; update the proposed site plan on the display screen, the updated proposed site plan specifying: i) the alternative location in the geographical region, and ii) a prediction of wireless coverage provided by the wireless base station in the alternative location.

The ordering of the steps above has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in applications such as installation management of one or more base stations in a wireless network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations, elements, aspects, etc.) of the invention(s), the reader is directed to the textual Detailed Description section and corresponding figures of the present disclosure as further discussed below. Thus, the following Detailed Description, in addition to providing an intricate description of details of the invention, also provides a further summary of aspects of the invention or inventions.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As mentioned above, according to embodiments herein, a graphical user interface displays an overlay of a proposed site plan of one or more new base stations with respect to an existing network infrastructure map in a geographical region.

The proposed site plan specifies a location in which to install at least one new base station. While in the field, using the graphical user interface as a guide, an installation specialist performs an in-person survey of the geographical region and proposed location to determine whether the proposed location is suitable for installation of the new wireless base station. The installation specialist may identify an obstacle, impediment, etc., that would inhibit coverage provided by the new base station if installed at the proposed location.

In one embodiment, via input to the graphical user interface, the installation specialist proposes an alternative location in which to install the new base station. A processor performs a validity check and provides feedback indicating whether installation of the new base station at the alternative location as proposed by the installation specialist is acceptable.

In accordance with further embodiments as discussed herein, the graphical user interface also can support functions such as collecting site survey data, monitoring progress of the installation, keeping track of installation impediments (and corresponding parameters) identified in the field survey, etc.

Figure 1:
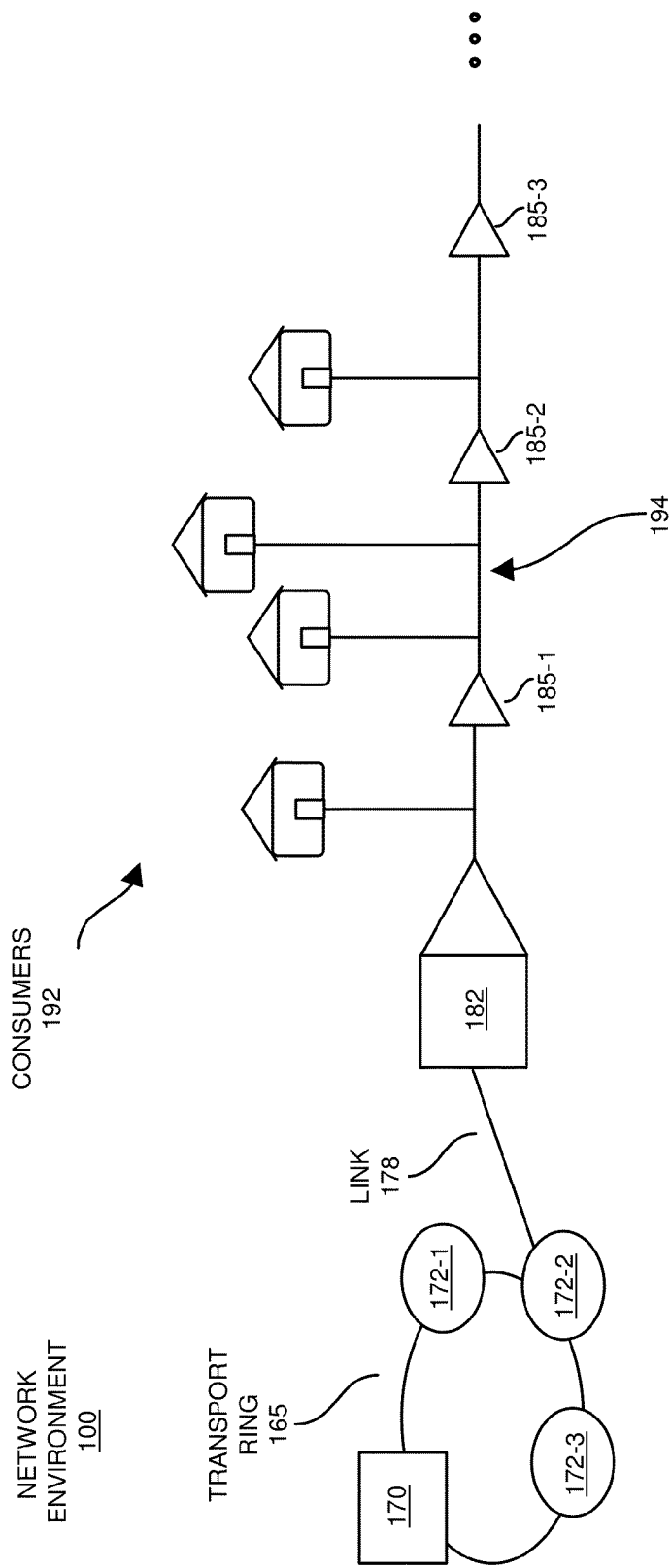
FIG. 1 is an example diagram of a conventional communication system for distributing data and providing network access.

More specifically, FIG. 1 is an example diagram of a conventional communication system for distributing data and providing network access.

As shown, the network environment 100 can include a data distribution manager 170 that facilitates reception and transmission of data over transport ring 165 to hubs 172 (e.g., hub 172-1, hub 172-2, hub 172-3, . . . ).

In this example, communication link 178 provides connectivity between hub 172-2 and node 182. Communication link 178 can be any type of link such an optical link, wire link, etc.

Node 182 receives the data transmitted over communication link 178 and forwards the data to consumers 192 through network infrastructure 194. Network infrastructure 194 can include resources such as communication links, amplifiers, power supplies, etc., facilitating distribution of data to consumers 192.

Figure 2:
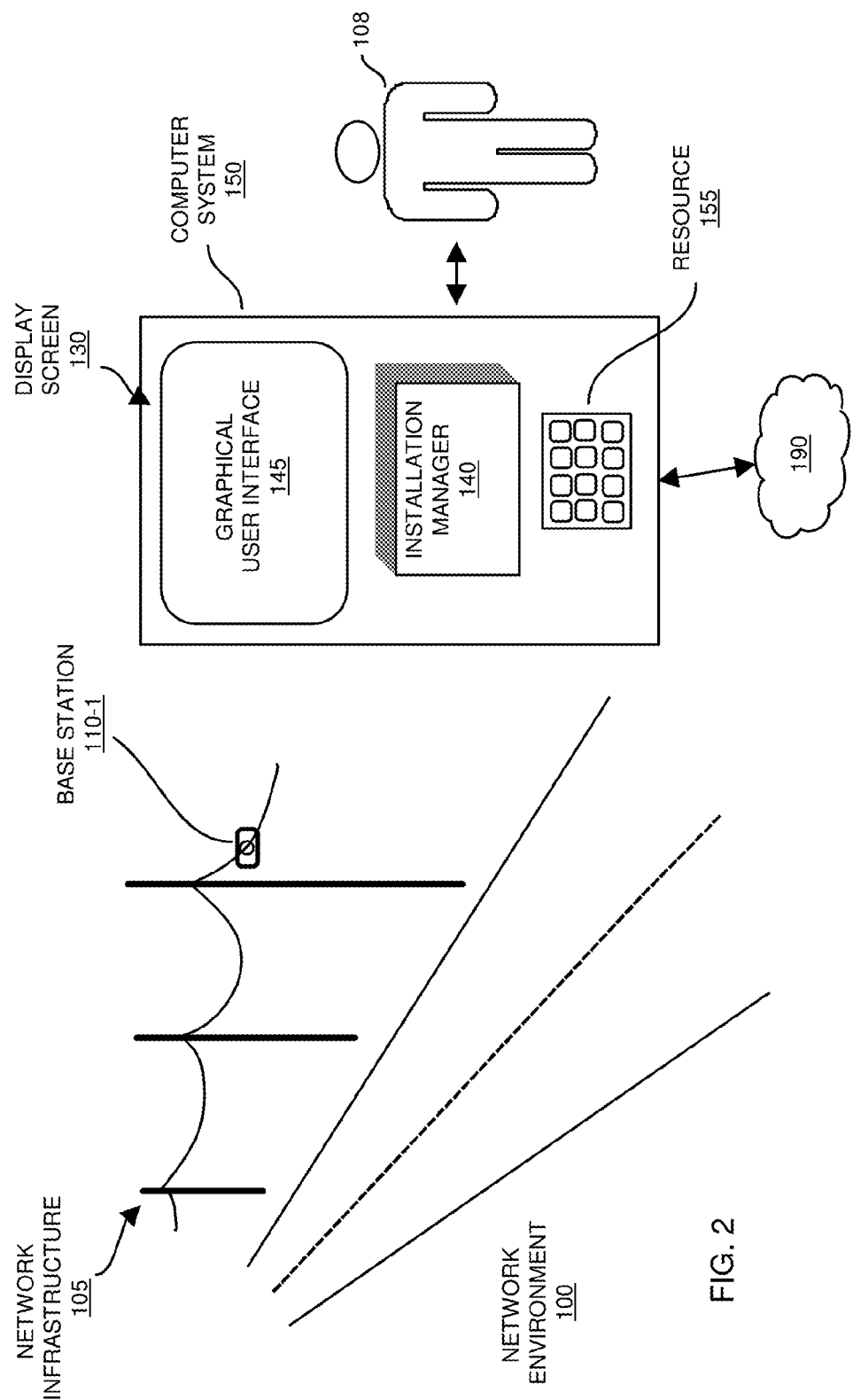
FIG. 2 is an example diagram illustrating use of an installation manager application facilitating installation of one or more wireless base stations according to embodiments herein.

FIG. 2 is an example diagram illustrating use of an installation manager application according to embodiments herein.

As shown, network environment 100 includes network infrastructure 105 facilitating distribution of data to one or more subscribers.

By way of a non-limiting example, network infrastructure 105 can include any suitable type of resource such as power supplies to inject AC power into cables, taps, directional couplers providing access to power and data links, line amplifiers, nodes for backhaul data aggregation, utility poles, fiber links, coaxial links, wireless base stations, overhead resources, underground resources, cabinets, vaults, pedestals in which to mount one or more base stations, etc.

One embodiment herein includes a computer system 150. The computer system 150 executes installation manager 140. Installation manager 140 facilitates installation of one or more new base stations in network environment 100. For example, in one embodiment, as will be discussed further in this specification, the installation manager 140 initiates display of graphical user interface 145 on display screen 130 of computer system 150.

The user 108, such as an installation specialist, base station installation technician, etc., controls the installation manager 140 via input through input/output resources 155. Computer system 150 can include any type of one or more different types of input/output resources 155 such as a keypad, computer mouse, touch screen, etc. Via the input/output resources 155, the user 108 is able to operate and control the installation manager 140.

In one embodiment, as will be discussed later in this specification, the installation manager 140 supports functions such as guiding the user 108 during installation of one or more base stations with respect to network infrastructure 105, collecting of survey data, etc.

The computer system 150 can be any type of client device enabling display of graphical user interface 145 on display screen 130. For example, in one embodiment the computer system 150 is a thin client in which bulk of processing capability is provided by services in network 190. In accordance with another embodiment, the computer system 150 can include suitable processing functionality to perform appropriate calculations at the computer system 150. In accordance with further embodiments, a portion of processing associated with installation manager 140 can be performed locally by computer system 150 while another portion of processing associated with installation manager 140 can be performed by remote resources in network 190. Computer system 150 can be portable such that user 108 is able to freely move around during installation.

Figure 3:
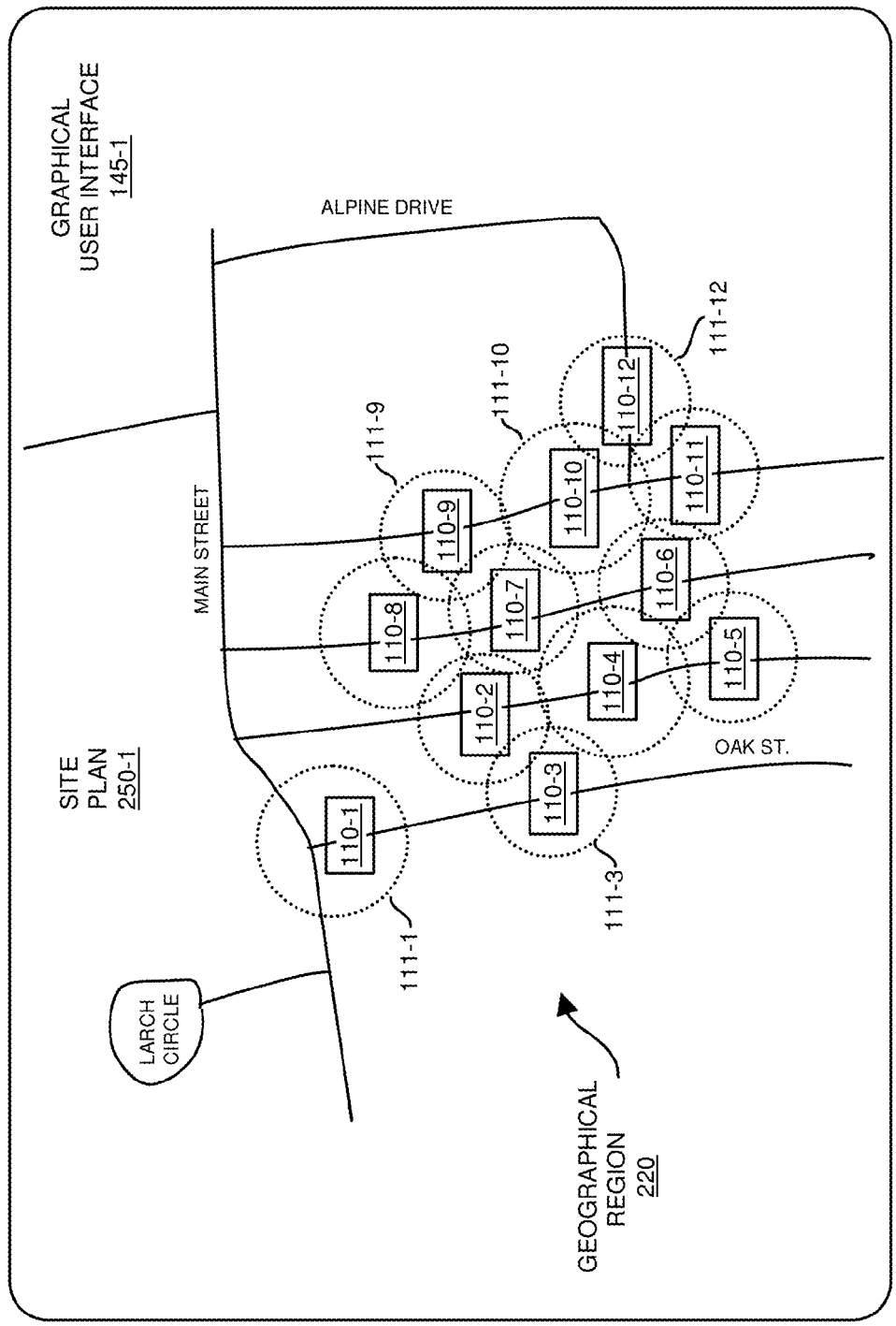
FIG. 3 is an example diagram illustrating a proposed site plan including multiple wireless base stations according to embodiments herein.

FIG. 3 is an example diagram illustrating a proposed site plan including a display of sites at which to install multiple wireless base stations according to embodiments herein.

In this example, the graphical user interface 145-1 includes a display of site plan 250-1 for installation in geographical region 220. Graphical user interface 145-1 includes a display of landmarks such as streets, buildings, etc.

Site plan 250-1 in graphical user interface 145-1 includes symbols of base stations 110 (e.g., base station 110-1, base station 110-2, base station 110-3, base station 110-4, base station 110-5, base station 110-6, base station 110-7, base station 110-8, base station 110-9, base station 110-10, base station 110-11, base station 110-12, etc.) to indicate proposed locations of installing respective base stations.

As shown, the base station 110-1 provides predicted wireless coverage 111-1; the base station 110-3 provides predicted wireless coverage 111-3, the base station 110-9 provides predicted wireless coverage 111-9; the base station 110-10 provides predicted wireless coverage 111-10; the base station 110-12 provides predicted wireless coverage 111-12; and so on.

Accordingly, via display of the graphical user interface 145-1 as discussed site plan 250-1, the user 108 is able to identify locations in which to install one or more new base stations 110 and their respective predicted wireless coverage.

Figure 4:
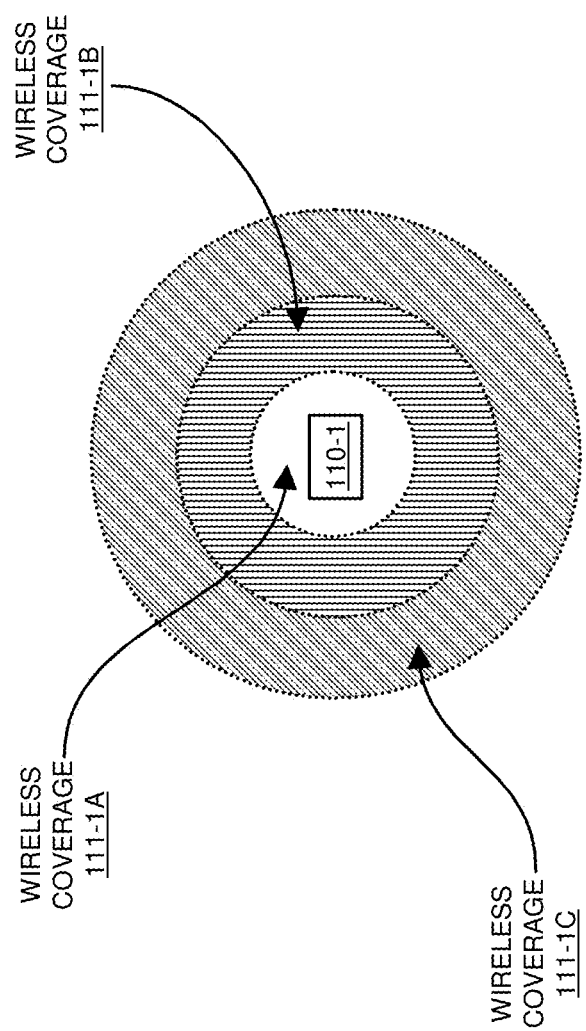
FIG. 4 is an example diagram illustrating multiple shadings to indicate varying signal strengths within a wireless coverage zone according to embodiments herein.

FIG. 4 is an example diagram illustrating highlighting to indicate varying signal strengths within a wireless coverage zone according to embodiments herein.

For example, the predicted strength in a region of wireless coverage weakens further away from a respective base station. In accordance with one embodiment herein, the graphical user interface 145 initiates display of a resource such as base station 110-1. In one embodiment, the graphical user interface 145 displays wireless coverage 111-1 as different RF strengths.

As an example, the graphical user interface 145 utilizes a first visual indication (e.g., a first color, shading, etc.) in region 111-1A to indicate a first RF strength associated with wireless coverage 111-1; the graphical user interface 145 utilizes a second visual indication (e.g., a second color, shading, etc.) in region 111-1B to indicate a second RF strength associated with wireless coverage 111-1; the graphical user interface 145 utilizes a third visual indication (e.g., a first color, shading, etc.) in region 111-1C to indicate a third RF strength associated with wireless coverage 111-1; and so on. The visual indications indicate that the RF strength weakens further away the distance from the base station 110-1.

Accordingly, an installation specialist viewing graphical user interface 145 on display screen 130 can identify a degree of RF coverage provided by each base station.

In one embodiment, each of the wireless coverage 111 areas displayed in the site plan 250-1 for the respective base stations 110 can be displayed in a similar manner such that the use 108 can identify which portions of a geographical region 220 will provide better RF strength and which portions of geographical region 220 will provide a weaker signal strength. For regions of overlapping coverage by multiple base stations, the higher signal strength regions take precedent for display on the display screen 130. In other words, if two base stations provide overlapping coverage of different strengths, the graphical user interface 145 displays the highest RF strength for the overlapping region.

Figure 5:
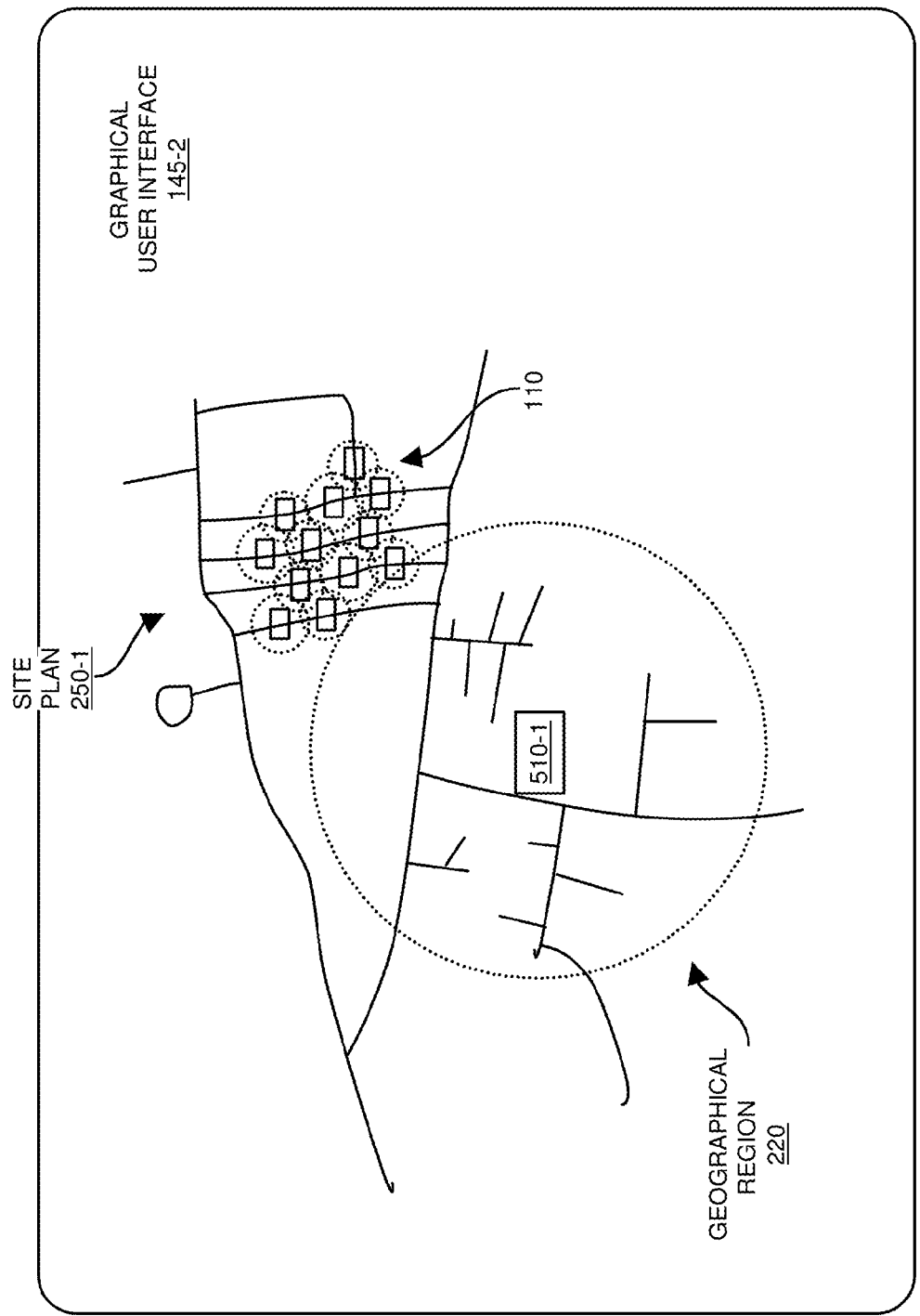
FIG. 5 is an example diagram illustrating a graphical user interface displaying coverage provided by a long-range base station relative to multiple short-range base stations according to embodiments herein.

FIG. 5 is an example diagram illustrating of a graphical user interface displaying coverage provided by a long-range base station relative to multiple short-range base stations according to embodiments herein.

The user 108 can provide input to zoom in and zoom out of a particular view of the site plan 250-1 on graphical user interface 145. In this example embodiment, the user 108 provides input to installation manager 140 to zoom out of a view. The input can be inputted to the installation manager 140 via any suitable technique such as input from a keyboard, computer mouse, etc.

Subsequent to receiving a zoom out command, the installation manager 140 initiates display of a greater portion of the site plan 250-1 in graphical user interface 145-2. Assume in this example that the base stations 110 are short-range base stations (e.g., pico base stations, WiFi base stations, 802.11 base stations, etc.) providing wireless coverage to subscribers. Base station 510-1 such as a long-range base station provides wireless coverage 511-1 to subscribers in the geographical area.

Thus, the graphical user interface 145 can be configured to display wireless coverage provided by different types of base stations (e.g., long-range base stations, short-range base stations, etc.). For example, the graphical user interface 145-2 can display coverage provided by long-range base stations, short-range base stations, etc. Long-range base stations can include resources cell phone towers. As mentioned, short-range base stations can include resources such as WiFi base stations, pico-cells, etc.

In accordance with yet another embodiment, the graphical user interface 145 can be configured to initiate display of an overlay indicating wireless coverage provided by a set of one or more long-range base stations (such as base station 510-1) operated by a wireless network service provider in the geographical region. In one embodiment, the wireless base stations 110 as specified by the site plan 250-1 can be short-range base stations to fill in dead zones in a vicinity of one or more long-range base stations.

Thus, via the graphical user interface 145-2, the user 108 is able to identify regions in which the base stations 110 provide additional coverage with respect to wireless coverage provided by the base station 510-1.

Figure 6:
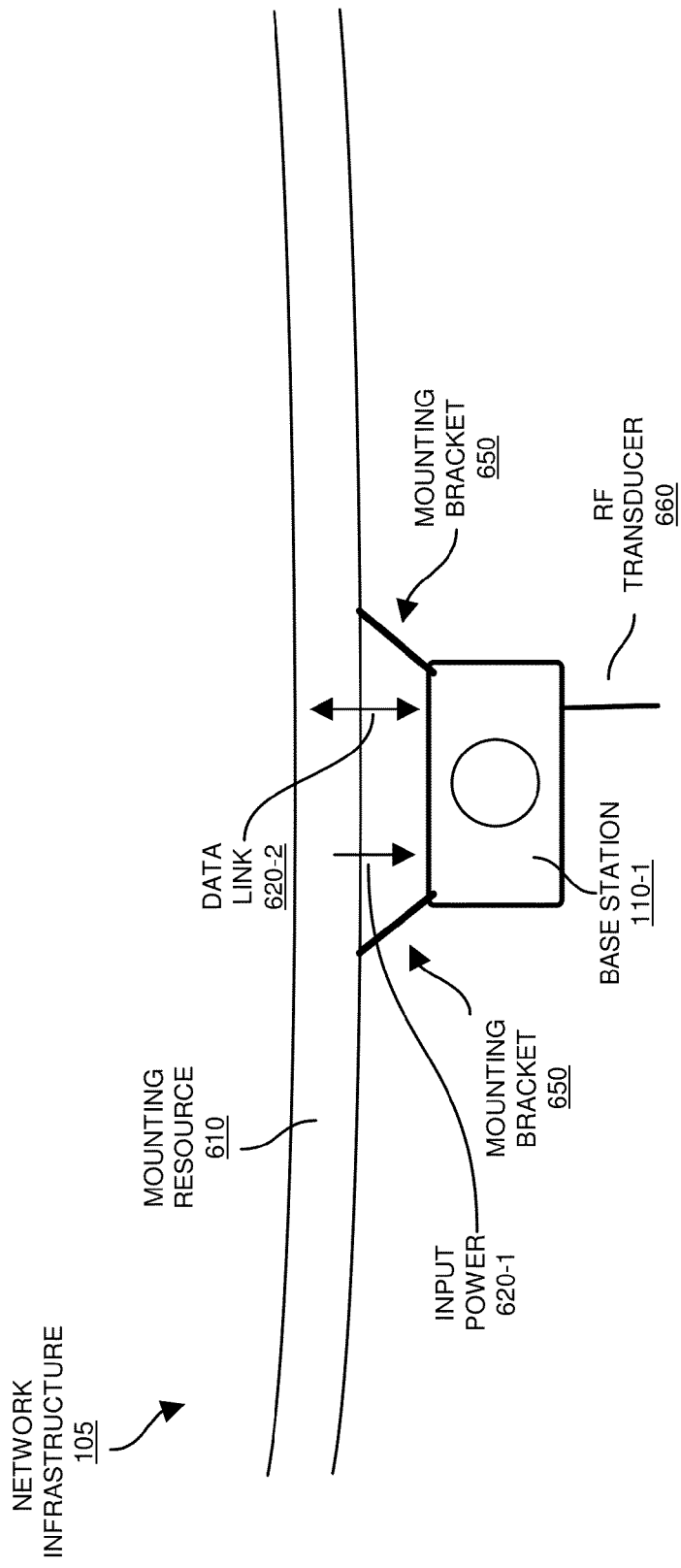
FIG. 6 is an example diagram illustrating mounting of a wireless base station to existing network infrastructure according to embodiments herein.

FIG. 6 is an example diagram illustrating mounting of a wireless base station to existing network infrastructure according to embodiments herein.

As shown, the network infrastructure 105 can include mounting resource 610 on which to mount base station 110-1. Mounting resource 610 can be any suitable resource. For example, mounting resource can be a wire between utility poles from which to mount the base station 110-1 to existing network infrastructure 105.

Mounting brackets 650 secure the base station 110-1 to the mounting resource 610.

By way of a non-limiting example, in an aerial application, mounting resource 610 can be a bundle of resources including a steel cable extending between utility poles. A power supply resource in mounting resource 610 supplies input power 620-1 to base station 110-1. Data link 620-2 connects the base station 110-1 to the existing network infrastructure 105. The data link can be a wireless or a wired link to the pre-existing network infrastructure 105. Data link can support two-way communications.

Base station 110-1 can include one or more RF transducers 660 in which to provide respective wireless coverage 111-1.

As previously discussed, network infrastructure 105 can include many different types of resources in which to mount base station 110. As an alternative to mounting the base stations 110 on a cable resource, the one or more base stations can be mounted to other resources located on, near, or below the ground level.

Figure 7:
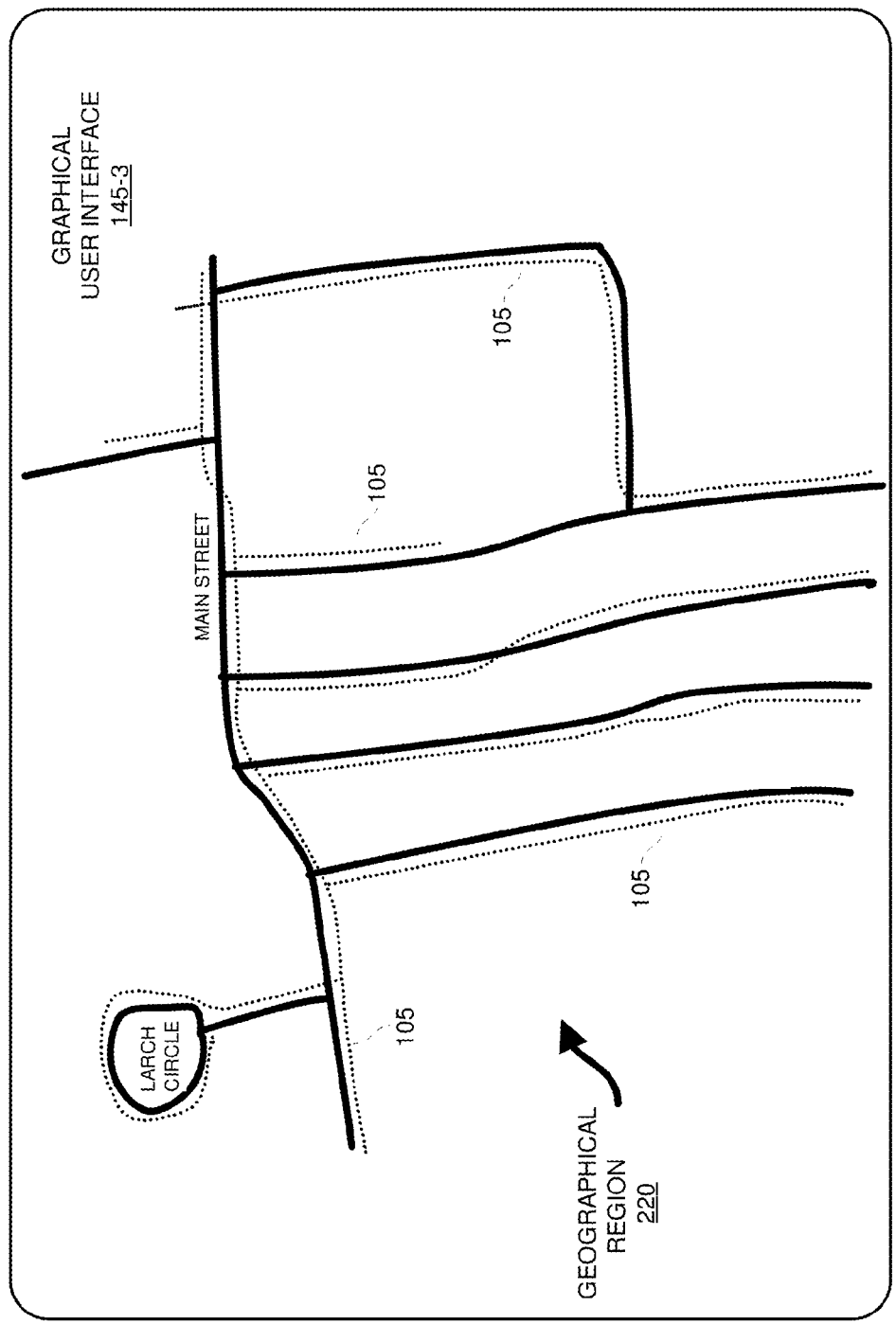
FIG. 7 is an example diagram illustrating display of a network infrastructure map according to embodiments herein.

FIG. 7 is an example diagram illustrating display of a network infrastructure map according to embodiments herein.

As previously discussed, network infrastructure 105 may already exist in geographical region 220. Graphical user interface 145-3 displays an overlay of existing network infrastructure 105 on a street map. Accordingly, the user 108 viewing display screen 130 can identify a presence a location of existing network infrastructure resources in a geographical region.

Figure 8:
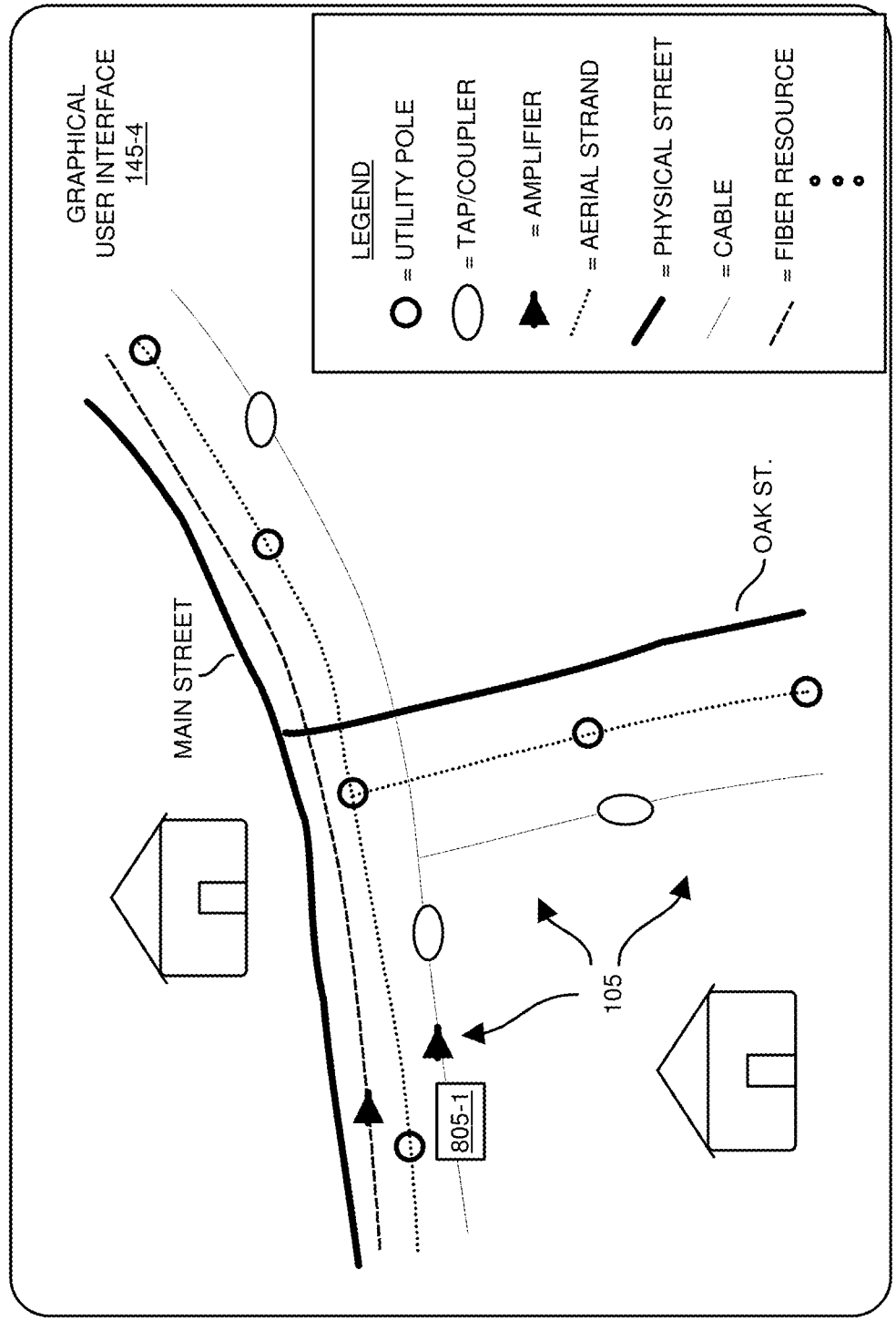
FIG. 8 is an example diagram illustrating display of a network infrastructure map on a graphical user interface according to embodiments herein.

FIG. 8 is an example diagram illustrating display of network infrastructure map and a corresponding street map on a graphical user interface according to embodiments herein. Symbols displayed in the graphical user interface 145 represent corresponding objects located in the geographical region.

As shown, the user 108 can zoom in or enlarge display a map of the network infrastructure 105 (at an intersection of Main Street and Oak Street in FIG. 7) to view a location of additional resources located in a particular portion of geographical region 220. For example, in one embodiment, the graphical user interface 145-4 displays more details associated with network infrastructure 105 such as a physical location of utility poles, aerial resources on which to potentially mount the base stations 110, amplifiers, cables, fiber resources, taps, couplers, underground resource 805-1, etc. Accordingly, via the details displayed in graphical user interface 145-4, the user 108 can identify presence and/or locations of the different types of resources in a geographical region.

Figure 9:
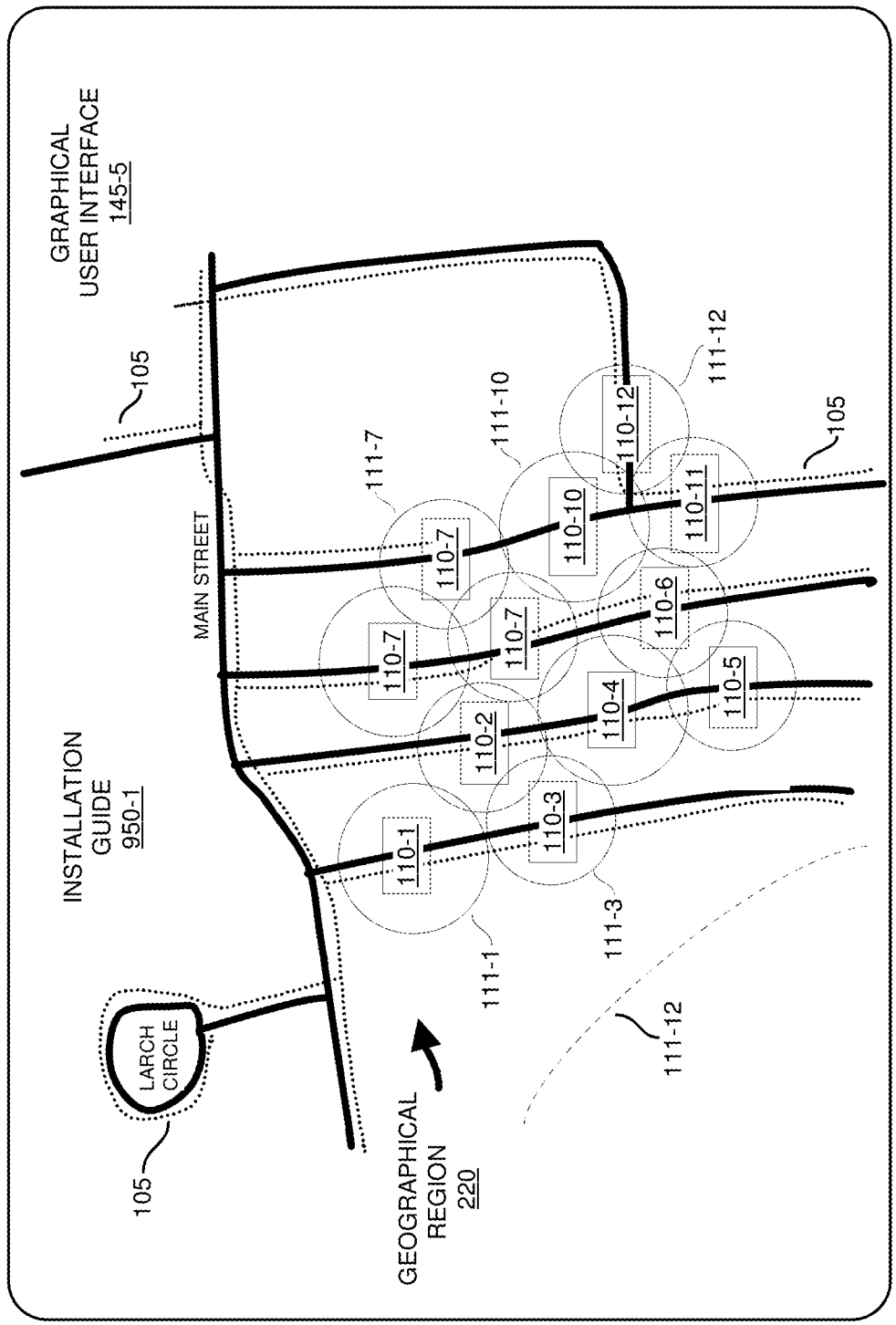
FIG. 9 is an example diagram illustrating an overlay of a proposed site plan with respect to resources in an existing network infrastructure map according to embodiments herein.

FIG. 9 is an example diagram illustrating an overlay of a proposed site plan with respect to resources in a network infrastructure map according to embodiments herein.

As shown, the installation manager 140 displays installation guide 950-1 on graphical user interface 145-5. Installation guide 950 includes an overlay of a map of existing resources in network infrastructure 105 onto the proposed site plan 250-1 (or vise versa) for simultaneous viewing of both the network infrastructure 105 and the proposed site plan 250-1.

In one embodiment, the map of the network infrastructure 105 displayed on graphical user interface 145-5 indicates a location of and availability of network resources in which to mount the one or more wireless base stations 110.

Via settings selected by the user 108, the graphical user interface 145-5 can be controlled to display of wireless coverage provided by multiple different entities. For example, a first service provider can provide wireless coverage (e.g., wireless coverage 111-12) from one or more long-range base stations; as mentioned, additional base stations (e.g., short-range base stations, pico-base stations, WiFi base stations, etc.) can be added to a geographical region to provide additional coverage.

Figure 10:
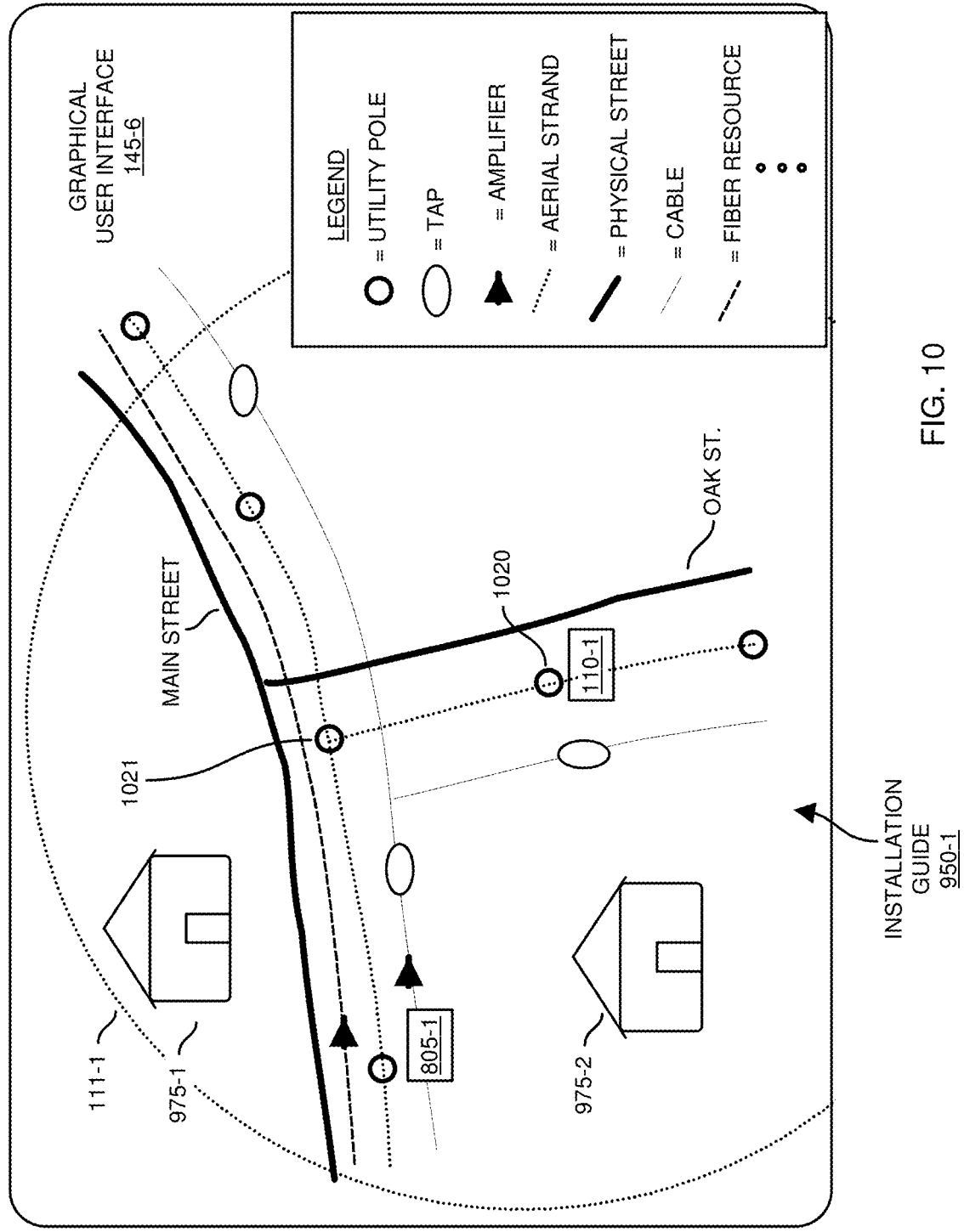
FIG. 10 is an example diagram illustrating a proposed location in which to mount a wireless base station to an existing network infrastructure according to embodiments herein.

FIG. 10 is an example diagram illustrating a graphical user interface according to embodiments herein.

As shown, the user 108 can zoom in or enlarge display of the installation guide 950-1 (e.g., simultaneous display of the site plane 250-1 and map of the network infrastructure 105) on graphical user interface 145-6. Graphical user interface 145-6 displays: i) a proposed location (e.g., near utility pole 1020) to install wireless base station 110-1 in a corresponding geographical region, and ii) a prediction of wireless coverage (e.g., wireless coverage 111-1) provided by the wireless base station 110-1 if installed in the proposed location. The location of a symbol representing base station 110-1 indicates the proposed location in which to install the base station 110-1. Accordingly, the installation specialist viewing display screen 130 is apprised of at least an approximate location or acceptable areas in which to install a wireless base station in a geographical region.

While in the field, the installation specialist can perform an in-person, physical survey of the geographical region (e.g., intersection of Main St. and Oak St.) to determine whether the proposed location or areas are suitable for installation of the wireless base station 110-1.

The installation of the wireless base station 110-1 at the proposed location near utility pole 102 may be impracticable due to, for example, an RF-blocking or RF-interfering obstacle in a vicinity of the proposed location.

Assume, in this example, during installation, that the installation specialist identifies an obstacle such as an object in a vicinity of Main St. and Oak St. that would inhibit the wireless base station 110-1 from providing the predicted wireless coverage 111-1 if installed at the proposed location. In other words, because of an unexpected object such as a large tree, hill, etc., near utility pole 1020, assume that the installation technician in the field identifies that installation of the wireless base station 110-1 at the proposed location near utility pole 1020 will not provide the desired or expected wireless coverage 111-1 as specified by the installation guide 950-1.

During the installation, the installation specialist can provide input to the installation manager 140 regarding a respective survey. The input can be feedback from the installation technician viewing the display screen and performing the in-person survey of the proposed location.

In one embodiment, accurate wireless coverage prediction is computationally intensive. A server in network 190 produces the prediction based on field data submitted by the client. The client simply displays the result produced by the server.

To avoid one or more identified obstacles, impediments, etc., the installation specialist (or other suitable resource) can propose installing the wireless base station 110-1 at an alternative location in the geographical region rather than at the originally proposed location as specified by the installation guide 950-1.

In accordance with further embodiments, the installation manager 140 executed on the computer system 150 receives input proposing installation of the wireless base station 110-1 at the alternative location. By way of a non-limiting example, the input can be dragging and dropping of a symbol representing the base station 110-1 to the alternative location. For example, in one embodiment, the installation specialist can mark a location on the display screen 130 or graphical user interface 145-6 indicating the proposed alternative location in which to potentially install the wireless base station 110-1 to avoid the detected impediment. Assume in this example that the installation specialist proposes to install the base station 110-1 near utility pole 1021 instead of near utility pole 1020 to avoid the identified obstruction in the field.

In response to receiving the input (e.g., the user 108 specifying the alternative location in graphical user interface 145-6 near utility pole 1021 in which to install the base station 110-1), the installation manager 140 initiates execution of a respective algorithm to determine whether the alternative site proposed by the installation specialist is acceptable. For example, the installation manager 140 can perform a validation check to determine whether the base station 110-1 can be installed at the proposed alternative location near utility pole 1021. Execution of validation check algorithm can be performed locally in the computer system 150, remotely via processing resources in network 190, and/or a combination of both.

Validation can include: performing appropriate calculations to determine whether installation of the base station 110-1 at the alternative location will provide appropriate wireless coverage to specific target locations such as building 975-1 and building 975-2; identifying whether appropriate network infrastructure resources (e.g., data throughput capability, power capability, etc.) are present or available for use at the proposed alternative location to support the base station 110-1, etc.

The graphical user interface 145 can provide a visual indication of a portion of the geographical region having no wireless coverage by any base station as a result of installing the wireless base station 110-1 at the alternative location instead of the originally proposed location. Accordingly, the installation specialist can identify whether a respective wireless network (including a set of multiple base stations) will be able to provide wireless coverage to a particular coordinate of interest such as a tagged or marked building, household, etc., in the geographical region. Instead of installing a single base station, the installation specialist can install one or more additional base stations to provide coverage in an area if installation at the alternative location does not provide appropriate coverage in the geographical region.

In one embodiment, the installation manager 140 updates the graphical user interface 145-6 on the display screen 130 to display the base station 110-1 in the alternative location. The updated site plan in the installation guide 950-1 can specify: i) the alternative location in the geographical region, and ii) based on the validation check, a prediction of wireless coverage provided by the wireless base station in the alternative location. Accordingly, based on guidance provided by the graphical user interface 145-6, an installation specialist in the field can easily determine whether an alternative location (as provided by a installation specialist or other resource) is suitable for installation of the wireless base station 110-1.

The graphical user interface 145-6 can be further configured to initiate display of a visual indication on the display screen to indicate whether the alternative location in the network infrastructure is a valid option to operate the wireless base station. By way of a non-limiting example, the visual indication can be a text message indicating that the alternative location, as proposed by the installation specialist in the field, is a valid location in which to install the wireless base station 110-1.

It is possible that the installation of the wireless base station 110-1 when installed at the alternative location near utility pole 1021 will not provide the same wireless coverage as the originally predicted wireless coverage 111-1. In such an instance, via the installation manager application, the updated display screen 130 can indicate the difference in coverage between coverage provided by installation of the wireless base station at the originally proposed location and installation of the wireless base station at the alternative location. Accordingly, the installation specialist can identify a difference in the wireless coverage depending on where the base station is installed.

The installation specialist (i.e., user 108) can view the display screen 130 to identify one or more null regions in which neither the wireless base station at the alternative location nor do any other resources in the network provide wireless coverage as anticipated by installing the wireless base station at the originally proposed location.

Note further that the installation manager 140 can be configured to provide a visual indication of one or more resources (such as a house, building, etc.) in the vicinity of the proposed location that must have access to the RF service provided by the newly installed base station 110-1. For example, households 975-1 and 975-2 can be bolded on the display screen 130 to indicate that the base station 110-1 must provide wireless coverage to households 975-1 and 975-2. Accordingly, the installation specialist (i.e., user 108) can determine a most suitable alternative location for installing the base station 110-1, assuming that installation of the base station in the originally proposed location is impracticable.

Figure 11:
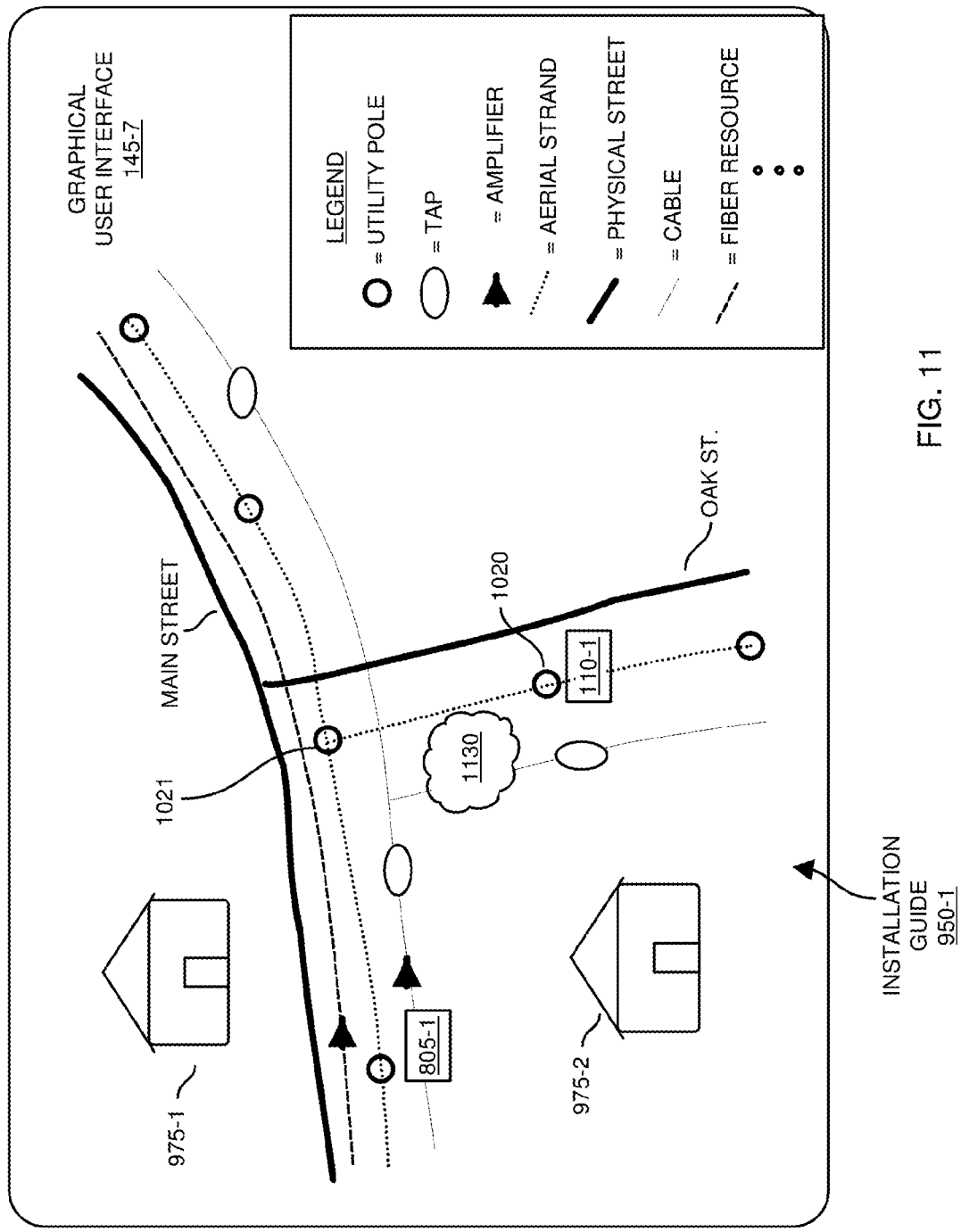
FIG. 11 is an example diagram illustrating a proposed location in which to mount a wireless base station to an existing network infrastructure according to embodiments herein.

Alternatively, or in addition to the above embodiment of marking specific locations such as households 975-1 and 975-2, to view a difference in coverage between the coverage expected by installing the wireless base station 110-1 at the proposed location and the alternative location, embodiments herein can include initiating simultaneous display of the prediction of wireless coverage provided by the wireless base station 110-1 in the alternative location with respect to the prediction of wireless coverage provided by the wireless base station 110-1 in the originally proposed location. Accordingly, the user 108 can easily identify whether installation of the wireless base station 110-1 in the alternative location would be an acceptable solution to avoiding or overcoming the obstacle 1130 and providing appropriate wireless coverage. FIG. 11 is an example diagram illustrating a proposed location in which to mount a wireless base station to an existing network infrastructure according to embodiments herein.

In one embodiment, the computer system 150 and installation manager 140 support a robust coverage prediction capability compatible for base station deployments. Wireless coverage patterns resulting from mounting of short-range wireless base stations to assets, such as strand wires, vaults, etc., may behave differently than conventional long-range cellular coverage patterns.

Selection of an alternative site in which to install the base stations 110 can be automated. For example, as discussed below, the user 108 can input parameter such as a location, height, width, density, etc., associated with one or more objects or impediments that are identified in the field during installation. In other words, the user 108 can input information collected during a survey of a particular site. The information inputted by the user 108 to the installation manager 140 can include: information describing the terrain, land use and land cover, site specific information such as asset type and height to which the base station will be mounted, the type of wireless technology being deployed at the base station, RF frequency at which base station operates, vendor implementation specific information, location of potentially interfering objects, etc.

The installation manager 140 can be configured to automatically perform an analysis to identify one or more suitable alternative locations in which to install the base station 110-1 based on knowing factors such as resources available in network infrastructure 105, a location of the one or more impediments in the immediate location, a level of performance to be provided by the base station 110-1, power consumption of the base station 110-1, targets such as household 975-1, 975-2 to be covered by the base station, etc.

More specifically, as an example, via input from a source such as the installation specialist (i.e., user 108), the installation manager 140 can be apprised of location information indicating a location of at least one obstacle in a vicinity of the originally proposed location near utility pole 1020. For example, the technician installing the wireless base station 110-1 can provide the information about the obstacle 1130 based on an in-person survey of the proposed location. The obstacle 1130 can be one or more objects such as trees, buildings, etc., that unexpectedly blocks an RF signal produced by base station 110-1. The obstacle 1130 may also block RF signals transmitted from devices to the base station 110-1. Accordingly, the base station 110-1 may not receive transmitted RF signals due interference. In one embodiment, the installation specialist inputs details associated with the obstacle to the installation manager 140.

As discussed above, the installation manager 140 can be configured to perform suitable calculations to independently determine, while taking into account the one or more obstacles 1130 identified by the installation specialist, one or more alternative locations in which to install the base station 110-1 in the geographical region. The graphical user interface 145-7 can be configured to display a symbol representing the obstacle 1130 as specified by the user 108. Accordingly, the installation manager 140 is apprised of the location of the obstacle 1130.

Figure 12:
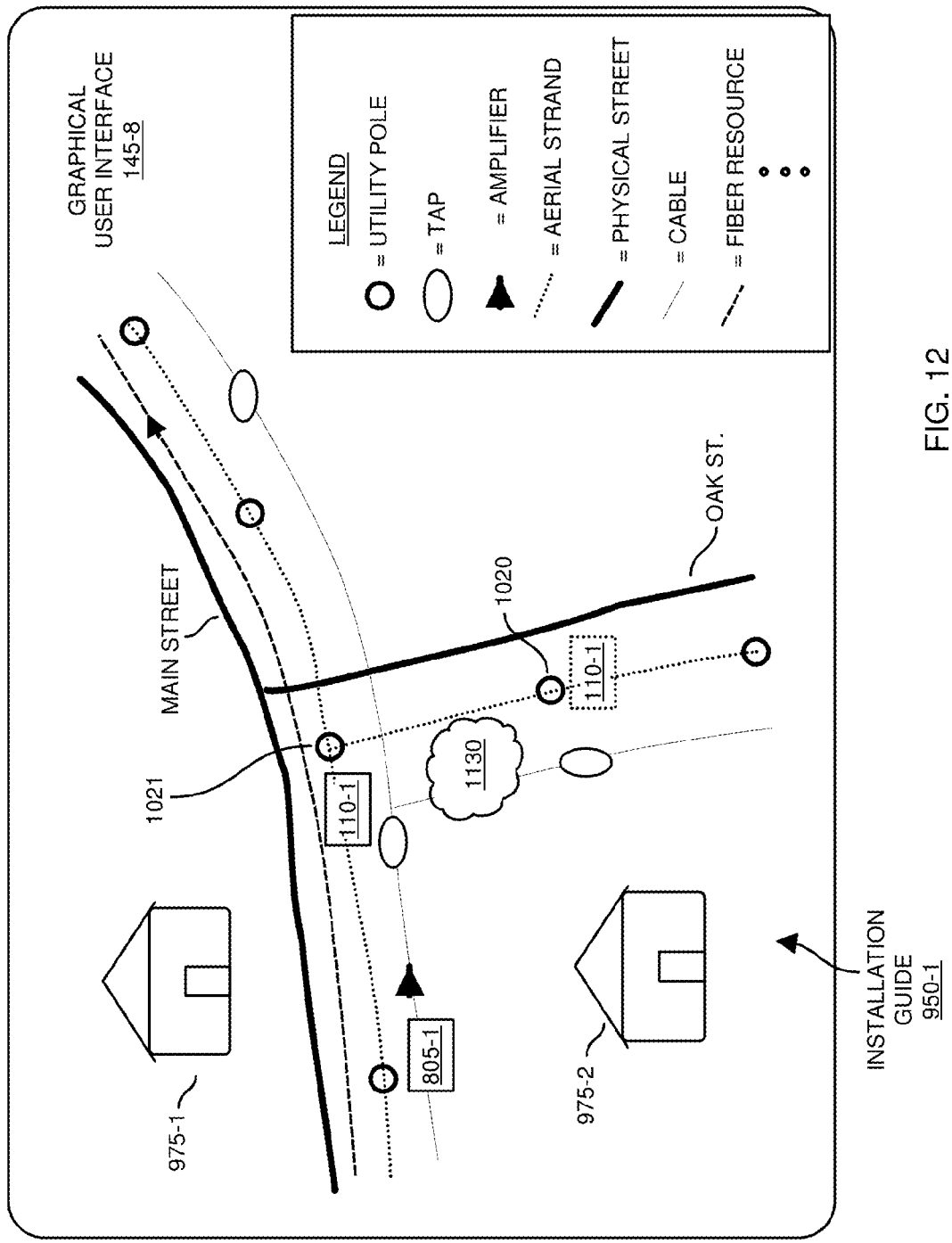
FIG. 12 is an example diagram illustrating display of an alternative location in which to mount a wireless base station to existing network infrastructure according to embodiments herein.

In one embodiment, as shown in FIG. 12, after identifying one or more alternative locations in which to install the base station 110-1, the installation manager 140 updates the graphical user interface 145-8 to display the proposed alternative location or acceptable region in which to mount the wireless base station 110-1 to existing network infrastructure in the nearby region. Accordingly, the installation specialist can be apprised of one or more suitable alternative locations in which to install the base station to avoid any obstacles.

In one embodiment, the user 108 applies a command to the base station 110-1 displayed near utility pole 1021 to notify the installation manager 140 to perform an analysis and identify one or more alternative location in which to install the base station 110-1. Thus, in one embodiment, the installation manager 140 receives a command applied to base station 110-1 displayed in the graphical user interface 145. As mentioned, the command can indicate that the user 108 would like to perform an appropriate analysis to identify the one or more alternative locations in which to mount the wireless base station based on the installation manager 140 knowing the location and attributes of obstacle 1130.

In response to receiving the command to identify one or more alternative locations in which to install the base station 110-1, the installation manager 140 identifies resources associated with network infrastructure 105 that will be needed to operate the wireless base station 110-1 according to a predetermined performance level. For example, the wireless base station 110-1 may be required to support a certain data bandwidth, the wireless base station may consume a certain amount of power, etc.

In one embodiment, the installation manager 140 has access to network infrastructure resource information indicating the ability of different locations of the network infrastructure 105 to provide data bandwidth, power availability, etc. The installation manager 140 processes the network infrastructure resource availability information to identify alternative locations of the network infrastructure in a vicinity of the proposed location that have an ability to support the wireless base station in accordance with the required resources. Subsequent to identifying one or more appropriate alternative locations, the installation manager 140 then updates the graphical user interface 145 to provide a visual indication specifying multiple acceptable alternative locations of the network infrastructure having the ability to support wireless base station 110-1.

As mentioned, the installation manager 140 can receive location information indicating a location of at least one obstacle in a vicinity of the proposed location. The installation manager 140 can identify and then subsequently display multiple acceptable alternative locations in which to install the wireless base station on the display screen 130. The user 108 can select a location amongst the possible acceptable locations to notify the installation manager 140 where the base station 140 has been mounted.

Figure 13:
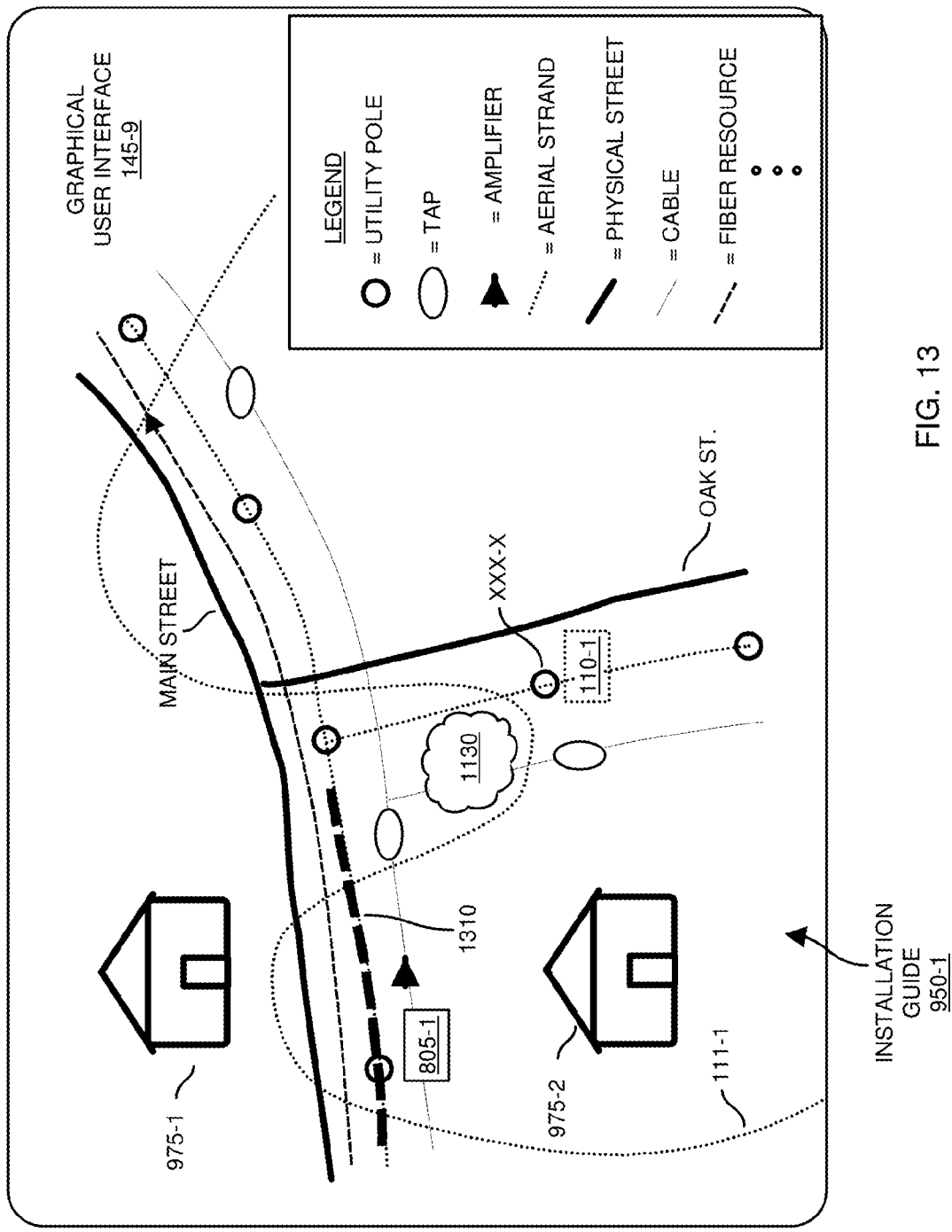
FIG. 13 is an example diagram illustrating display of acceptable alternative locations in which to mount a wireless base station to an existing network infrastructure according to embodiments herein.

FIG. 13 is an example diagram illustrating display of acceptable alternative locations in which to mount a wireless base station to an existing network infrastructure according to embodiments herein.

By further way of a non-limiting example, the visual indication 1310 of alternative locations to which the wireless base station 110-1 can be mounted can represent a continuum of a physical cable resource of the network infrastructure 105 displayed in the graphical user interface 145-9. In such an embodiment, the installation specialist can selectively mount the wireless base station to any point on the continuum.

In one embodiment, the continuum of the physical cable resource (e.g., a bundle including a steel strand, coaxial cable, and power supply resources) can include a communication link on which to convey data to and from the wireless base station. A power supply resource in the continuum of the physical cable resource can be tapped to provide power to the wireless base station when so mounted.

As mentioned, the installation manager 140 can be a tool that aids in tracking progress associated with a respective installation of multiple base stations. In one embodiment, subsequent to installation of a base station at a respective site, the user 108 can input relevant installation management information such as a location in which the base station 110-1 is installed, etc.

Also, as mentioned above, the installation manager 140 can be a tool to keep track of field survey information relevant to a proposed site plan and/or a representation of network infrastructure 105 displayed on the display screen 130. The field survey information inputted to and tracked by the installation manager 140 can include information such as obstacles (and corresponding attributes) that were discovered in the field during installation.

In accordance with further embodiments, based on one or more identified obstacles 1130 in a region, the installation manager application 140 (based on local processing or via computing in a cloud) generates a realistic wireless coverage 111-1 pattern for the base station 110-1, taking into account presence of the one or more identified obstacle(s) 1130 or objects in a vicinity of the proposed location of the new wireless base station 110-1.

For example, a user can input (via the graphical user interface 145-9) details (e.g., location, height, object, land terrain, etc.) of one or more obstacles 1130 as identified in the field. Based on the proposed location of installing the wireless base station 110-1, a processing resource associated with the installation manager 140 computes the theoretical coverage of the respective wireless base station 110-1. The theoretical coverage takes into account the proposed location for installing the base station 110-1 as well as the identified obstacles 1130 and how the obstacles 1130 may affect the wireless coverage provided by the wireless base station 110-1. The theoretical coverage 111-1 in graphical user interface 145-9 takes into account the identified obstacle(s) 1130 and thus is different than the originally anticipated coverage 111-1 as shown in graphical user interface 145-5.

In other words, in one embodiment, the graphical user interface 145-9 displays the computed wireless coverage 111-1 of the base station 110-1 taking into account blockage, interference, reflections, etc., that are theoretically caused by the newly discovered environmental conditions. The installation manager 140 initiates display of the computed new coverage on the base station 110-1 so that the user 108 need not guess in the field as to what affect or impact the one or more obstacles, terrain, environmental conditions, etc., will have on RF coverage 111-1 provided by the base station 110-1. Accordingly, the installation manager 140 can be configured to produce and display an accurate prediction of wireless coverage 111-1 with respect to a representation of the network infrastructure 105/base station 110-1 displayed on the display screen 130.

In accordance with yet further embodiments, the user 108 can move a symbol representing the base station 110-1 with respect to the network infrastructure on the display screen 130 to different locations to identify the coverage 111-1 provided by the base station 110-1 at the different locations. For example, as the user 108 moves (such as via dragging) the symbol representing the base station 110-1 on the graphical user interface 145-9, the installation manager 140 updates the wireless coverage 111-1 provided by the base station 110-1, taking into account affects of the obstacle 1130. Accordingly, the user 108 can quickly identify whether installation of the wireless base station 110-1 at each of multiple different newly proposed locations provides acceptable coverage in a region.

Certain highlighted targets or regions on the display screen 130 may need to be provided coverage by the new base station 110-1. By way of a non-limiting example, constantly updating the wireless coverage 111-1 as provided by the base station 110-1 in the graphical user interface 145-9 (depending on the obstacle 1130 and location of the wireless base station 110-1) ensures that the user 108 is apprised of whether the highlighted targets or regions needing the coverage can theoretically receive communications from the base station 110-1 if the base station is installed at a respective location.

Figure 14:
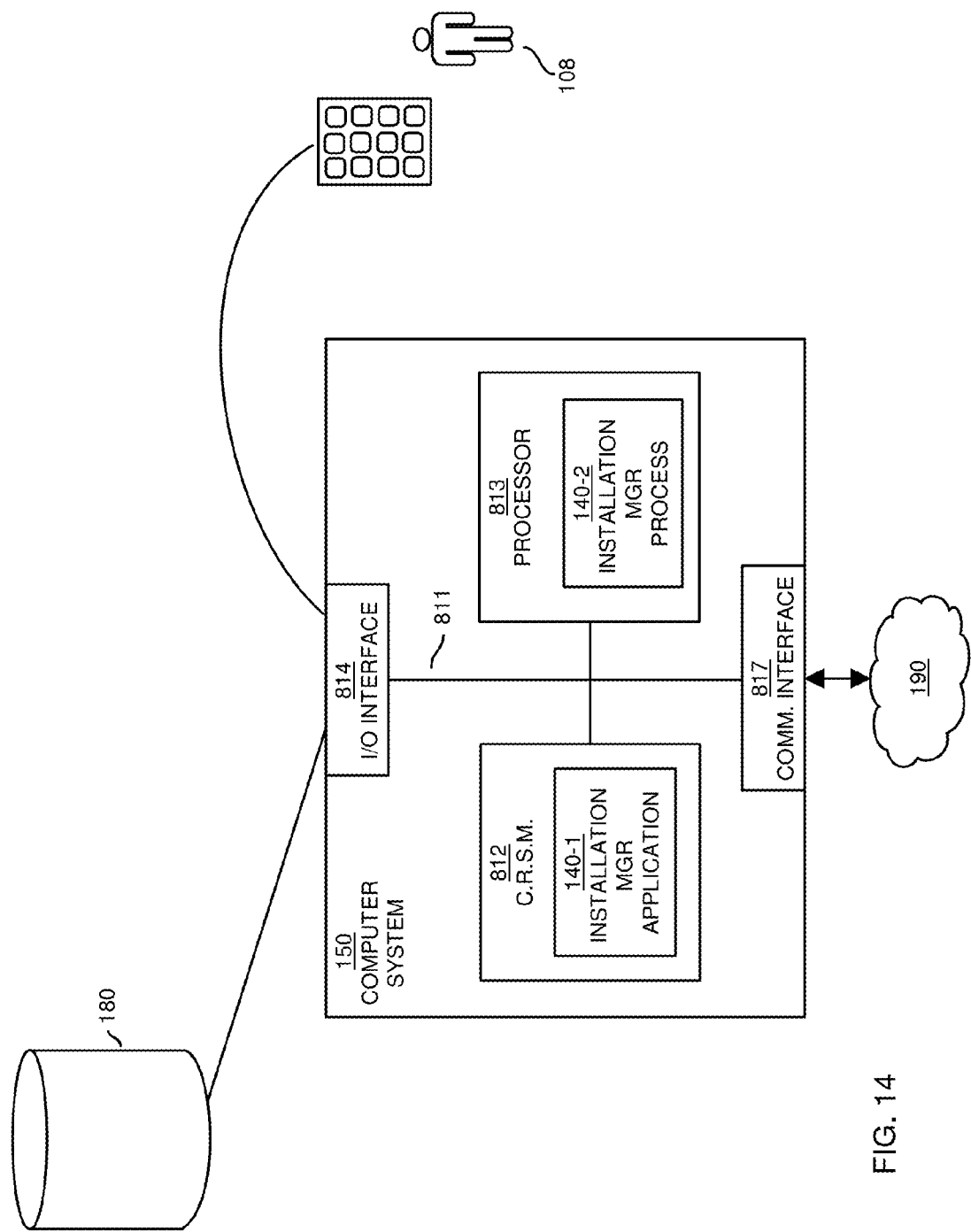
FIG. 14 is a diagram illustrating example hardware including a processor and an encoded hardware storage medium to execute according to embodiments herein.

FIG. 14 is an example block diagram of a computer system 150 for implementing any of the operations according to embodiments herein.

As shown, computer system 150 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 180 and, if present, other devices such as display screen, keypad, a computer mouse, etc.

Computer readable storage medium 812 can be any non-transitory storage device such as memory, optical storage, hard drive, floppy disk, etc. In one embodiment, the computer readable storage medium 812 stores instructions and/or data.

Communications interface 817 enables the computer system 800 and processor 813 to communicate over a resource such as network 190 to retrieve information from remote sources and communicate with other computers. Depending on the embodiment, any or all of the functionality associated with the installation manager 140 can be performed locally by processor 813, or via resources in network 190, or a combination of both.

I/O interface 814 enables processor 813 to retrieve or attempt retrieval of stored information from repository 180.

As shown, computer readable storage media 812 is encoded with installation manager application 140-1 (e.g., software, firmware, etc.) executed by processor 813. Installation manager application 140-1 can be configured to include instructions to implement any of the operations associated with installation manager application 140 as previously discussed.

During operation of one embodiment, processor 813 accesses computer readable storage media 812 via the use of interconnect 811 in order to launch, run, execute, interpret or otherwise perform the instructions in installation manager application 140-1 stored on computer readable storage medium 812.

Execution of the installation manager application 140-1 produces processing functionality such as installation manager process 140-2 in processor 813. In other words, the installation manager process 140-2 associated with processor 813 represents one or more aspects of executing installation manager application 140-1 within or upon the processor 813 in the computer system 150.

Those skilled in the art will understand that the computer system 150 can include other processes and/or software and hardware components, such as an operating system that controls allocation and use of hardware resources to execute installation manager application 140-1.

In accordance with different embodiments, note that computer system may be any of various types of devices, including, but not limited to, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside or be moved to any location in network environment 100.

Functionality supported by the installation manager application 140-1 will now be discussed via flowcharts in FIGS. 15-17. Note that the steps in the flowcharts below can be executed in any suitable order.

Figure 15:
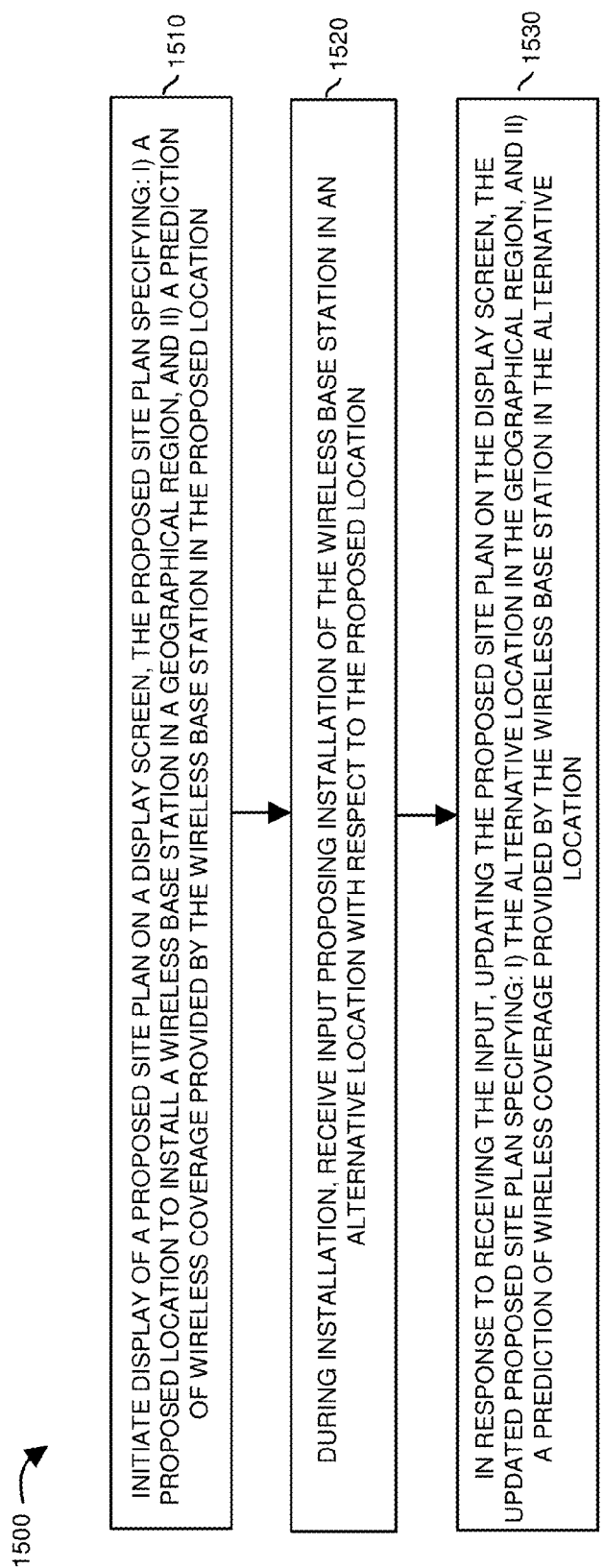
FIGS. 15-17 are flowcharts illustrating example methods according to embodiments herein.

FIG. 15 is a flowchart 1500 illustrating an example method according to embodiments herein. Note that there will be some overlap with respect to concepts as discussed above.

In step 1510, the installation manager 140 initiates display of a proposed site plan on a display screen 130, the proposed site plan specifies: i) a proposed location to install a wireless base station 110-1 in a geographical region 220, and ii) a prediction of wireless coverage 111-1 provided by the wireless base station 110-1 in the proposed location.

In step 1520, during installation of the wireless base station 110—by the installation specialist, the installation manager 140 receives input proposing installation of the wireless base station 110-1 in an alternative location with respect to the proposed location.

In step 1530, in response to receiving the input, the installation manager 140 updates the proposed site plan on the display screen 130, the updated proposed site plan specifying: i) the alternative location in the geographical region 220, and ii) a prediction of wireless coverage provided by the wireless base station 110-1 in the alternative location.

Figure 16:
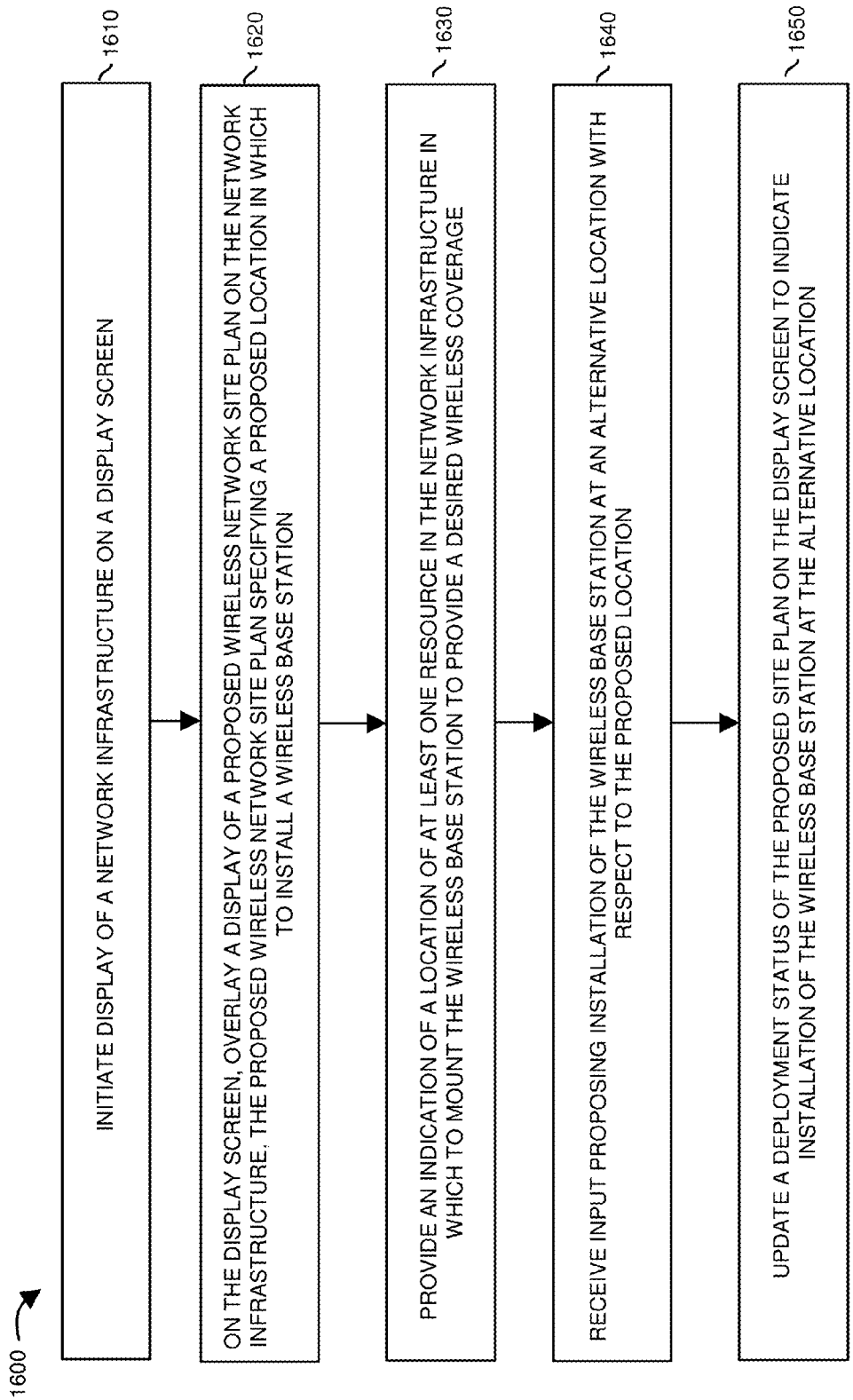

FIG. 16 is a flowchart 1600 illustrating an example method according to embodiments herein. Note that there will be some overlap with respect to concepts as discussed above.

In step 1610, the installation manager 140 initiates display of a map of network infrastructure 105 on a display screen 130.

In step 1620, on the display screen 130, the installation manager 140 overlays a display of a proposed wireless network site plan 250-1 on the network infrastructure map, the proposed wireless network site plan specifying a proposed location in which to install a wireless base station 110-1.

In step 1630, the installation manager 140 provides an indication of a location of at least one resource in the network infrastructure 105 in which to mount the wireless base station to provide a desired wireless coverage.

In step 1640, the installation manager 140 receives input proposing installation of the wireless base station 110-1 at an alternative location with respect to the proposed location.

In step 1650, the installation manager 140 updates a deployment status of the proposed site plan on the display screen 130 to indicate installation of the wireless base station at the alternative location.

Figure 17:
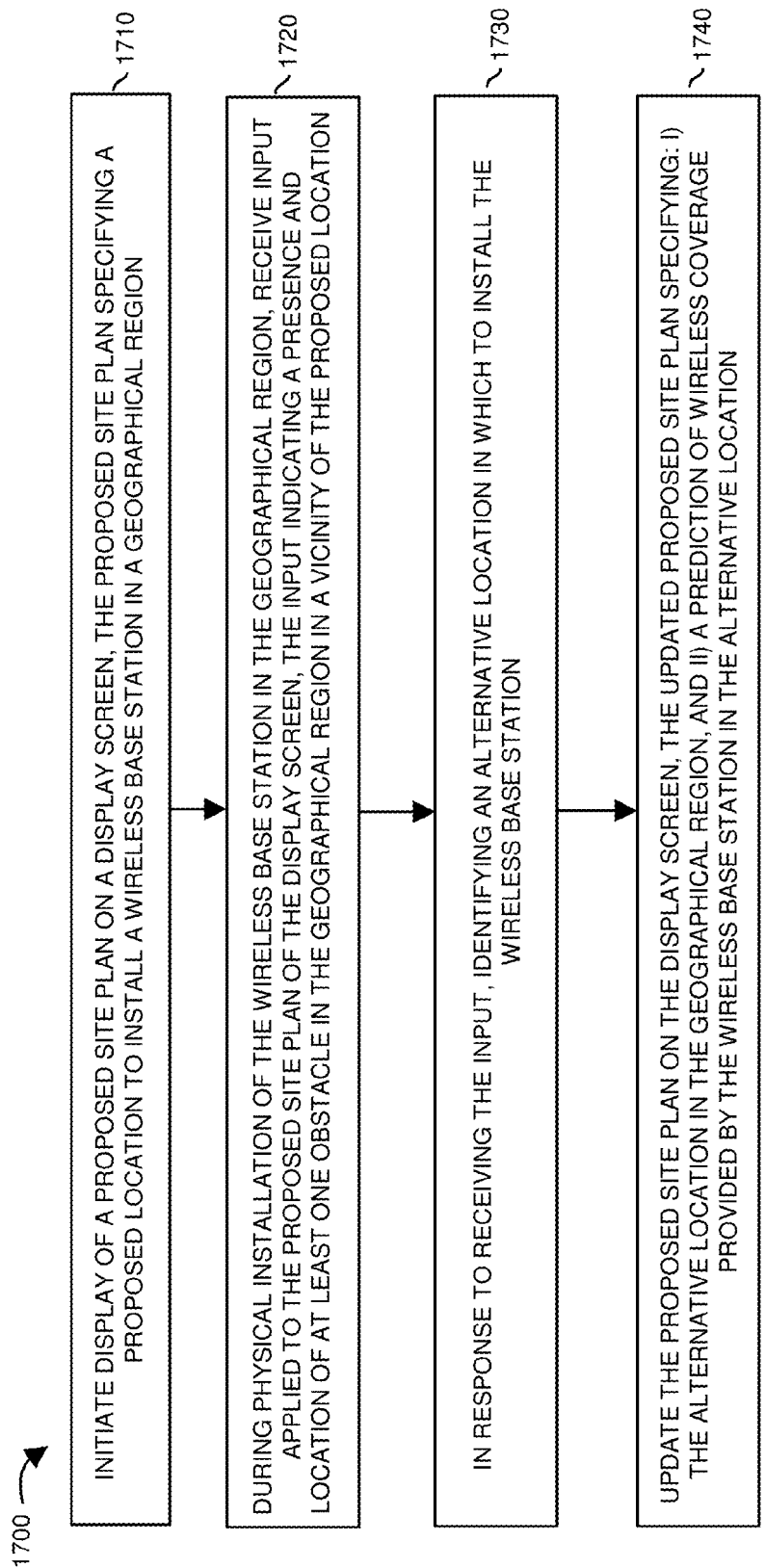

FIG. 17 is a flowchart 1700 illustrating an example method according to embodiments herein. Note that there will be some overlap with respect to concepts as discussed above.

In step 1710, the installation manager 140 initiates display of a proposed site plan on a display screen 130, the proposed site plan specifying a proposed location to install a wireless base station 110-1 in a geographical region 220.

In step 1720, during physical installation of the wireless base station 110-1 in the geographical region 220, the installation manager 140 receives input applied to the proposed site plan of the display screen 130. The input indicates a presence and location of at least one obstacle in the geographical region 220 in a vicinity of the proposed location.

In step 1730, in response to receiving the input, the installation manager 140 identifies an alternative location in which to install the wireless base station 110-1.

In step 1740, the installation manager 140 updates the proposed site plan on the display screen 130, the updated proposed site plan specifying: i) the alternative location in the geographical region 220, and ii) a prediction of wireless coverage provided by the wireless base station 110-1 in the alternative location.

Note again that techniques herein are well suited for use during installation of resources in wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   initiating display of a proposed site plan on a display screen, the proposed site plan specifying: i) a proposed location to install a wireless base station in a geographical region, and ii) a prediction of wireless coverage provided by the wireless base station in the proposed location;
   during installation of the wireless base station, receiving input from an installation technician viewing the display screen and installing the wireless base station in the geographical region, the input proposing installation of the wireless base station in an alternative location with respect to the proposed location due to presence of an RF-blocking obstacle discovered in the geographical region, the input further indicating a location of the RF-blocking obstacle in the geographical region in a vicinity of the proposed location, the RF-blocking obstacle inhibiting installation of the wireless base station at the proposed location; and
   in response to receiving the input, updating the proposed site plan on the display screen, the updated proposed site plan specifying: i) the alternative location in the geographical region, and ii) a prediction of wireless coverage provided by the wireless base station in the alternative location.

2. The method as in claim 1, wherein updating the display screen to display the updated proposed site plan includes:
on the display screen, initiating simultaneous display of the prediction of wireless coverage provided by the wireless base station in the alternative location with respect to the prediction of wireless coverage provided by the wireless base station in the proposed location.

3. The method as in claim 2, wherein updating the display screen to display the updated proposed site plan includes:
providing a visual indication of a portion of the geographical region in which the prediction of wireless coverage provided by the wireless base station in the alternative location and the prediction of wireless coverage provided by the wireless base station in the proposed location do not overlap.

4. The method as in claim 2 further comprising:
providing a visual indication of a specific location in a vicinity of the proposed location to which the wireless base station must provide wireless coverage.

5. The method as in claim 1, wherein the wireless base station is a short-range base station, the method further comprising:
on the proposed site plan, initiating display of wireless coverage provided by a set of at least one long-range base station operated by a service provider in the geographical region.

6. The method as in claim 1 further comprising:
receiving a command applied to the wireless base station in the proposed site plan displayed on the display screen;
identifying resources required to operate the wireless base station;
identifying alternative locations of a network infrastructure in a vicinity of the proposed location that have an ability to support the wireless base station as specified by the required resources; and
on the updated proposed site plan, providing a visual indication specifying multiple acceptable alternative locations of the network infrastructure having the ability to support wireless base station.

7. The method as in claim 6, wherein the visual indication indicates a continuum on a physical cable resource in the network infrastructure on which to selectively attach the wireless base station, the continuum of the physical cable resource including a communication link on which to convey data to the wireless base station and a power supply resource to power the wireless base station.

8. The method as in claim 1, wherein initiating display of the proposed site plan includes overlaying a display of resources in a network infrastructure on the proposed site plan; and
providing an indication of a location of a resource in the network infrastructure in which to attach the wireless base station.

9. The method as in claim 1 further comprising:
identifying operational parameters needed to operate the wireless base station; and
based on the operational parameters, performing an analysis to determine whether the alternative location has the ability to support operation of the wireless base station in accordance with the operational parameters.

10. The method as in claim 9 further comprising:
initiating display of a visual indication on the display screen to indicate whether network infrastructure at the alternative location is able to support operation of the wireless base station.

11. The method as in claim 1 further comprising:
from the installation technician installing the wireless base station in the geographical region, receiving attributes of the RF-blocking obstacle in the geographical region; and
on the display screen, displaying the prediction of wireless coverage provided by the wireless base station in the alternative location taking into account presence of the RF-blocking obstacle.

12. The method as in claim 11 further comprising:
displaying a representation of the RF-blocking obstacle on the display screen; and
on the display screen, updating the prediction of wireless coverage provided by the wireless base station taking into account the RF-blocking obstacle as a the installation technician moves a representation of the wireless base station on the display screen.

13. The method as in claim 1, wherein the input is a command directed to installation of the wireless base station, the method further comprising:
in response to receiving the command, identifying resources in a network infrastructure required to operate the wireless base station, the network infrastructure disposed in the geographical region;
identifying the alternative location as a portion of the network infrastructure that has an ability to support the wireless base station;
displaying a rendition of the network infrastructure in the proposed site plan on the display screen; and
on the updated proposed site plan, providing a visual indication specifying the portion of the network infrastructure that has the ability to support the wireless base station.

14. The method as in claim 13, wherein the visual indication indicates a continuum on a physical cable resource in the network infrastructure on which to selectively attach the wireless base station, the continuum of the physical cable resource including a communication link on which to convey data to the wireless base station and a power supply resource to power the wireless base station.

15. The method as in claim 1 further comprising:
identifying the alternative location as a portion of a network infrastructure in a vicinity of the proposed location, the portion of the network infrastructure verified as having an ability to support operation of the wireless base station; and
on the updated proposed site plan, displaying a visual indication specifying the portion of the network infrastructure as having the ability to support operation of the wireless base station.

16. The method as in claim 1 further comprising:
initiating display of a visual indication on the display screen, the visual indication indicating a continuum on a physical cable resource in the network infrastructure on which to selectively attach the wireless base station, the continuum of the physical cable having the ability to support operation of the wireless base station.

17. The method as in claim 1, wherein the alternative location is presented by the installation technician as a possible placement of the wireless base station in the geographical region, the prediction of wireless coverage provided by the wireless base station in the alternative location indicating to the installation technician whether placement of the wireless base station at the alternative location is acceptable in order to provide desired wireless coverage in the geographical region.

18. The method as in claim 1, wherein the installation technician proposes the installation of the wireless base station at the alternative location instead of the proposed location to avoid the RF-blocking obstacle in the geographical region.

19. The method as in claim 1 further comprising:
modifying the prediction of the coverage provided by the wireless base station in the proposed location based on the location of the RF-blocking obstacle; and
initiating display of a symbol representing the RF-blocking obstacle in the geographical region.

20. The method as in claim 19 further comprising:
initiating display of a first visual indication on the display screen to indicate a target location that must be within the wireless coverage provided by the wireless base station.

21. The method as in claim 20 further comprising:
initiating display of a second visual indication on the display screen, the second visual indication indicating a continuum on a physical cable resource in a network infrastructure on which to selectively attach the wireless base station, the continuum of the physical cable verified as having an ability to support operation of the wireless base station.

22. The method as in claim 1 further comprising:
initiating display of a network infrastructure in the proposed site plan displayed on the display screen, the network infrastructure indicating a layout of utility poles and corresponding physical cable resources on which to selectively attach the wireless base station; and
providing a visual indication a portion of the physical cable resources in the network infrastructure on which to selectively attach the wireless base station, the continuum of the physical cable verified as having an ability to support operation of the wireless base station.

23. The method as in claim 1, wherein the RF-blocking obstacle is discovered by the installation technician performing an in-person survey of the geographical region.

24. The method as in claim 23 further comprising:
displaying a rendition of a pre-existing network infrastructure on the display screen, the rendition of the pre-existing network infrastructure indicating a proximity of the pre-existing infrastructure in the geographical region; and
displaying a visual indication indicating a less-than-all portion of the pre-existing network infrastructure, the displayed less-than-all portion of the pre-existing network infrastructure indicating multiple acceptable alternative locations with respect to the proposed location in which to install the wireless base station.

25. A method comprising:
initiating display of a proposed site plan on a display screen, the proposed site plan specifying: i) a proposed location to install a wireless base station in a geographical region, and ii) a prediction of wireless coverage provided by the wireless base station in the proposed location;
during installation of the wireless base station, receiving input from an installation technician viewing the display screen and installing the wireless base station in the geographical region, the input proposing installation of the wireless base station in an alternative location with respect to the proposed location; and
in response to receiving the input, updating the proposed site plan on the display screen, the updated proposed site plan specifying: i) the alternative location in the geographical region, and ii) a prediction of wireless coverage provided by the wireless base station in the alternative location;
the method further comprising:
receiving a command applied to the wireless base station in the proposed site plan displayed on the display screen;
identifying resources in a vicinity of the proposed site plan, the resources required to operate the wireless base station;
identifying alternative locations of a pre-existing network infrastructure present in a vicinity of the proposed location that have an ability to support the wireless base station as specified by the required resources; and
on the updated proposed site plan, providing a visual indication specifying multiple acceptable alternative locations of the pre-existing network infrastructure including the identified resources supporting installation of the wireless base station.

26. The method as in claim 25, wherein the input indicates that installation of the wireless base station in the proposed location cannot provide the coverage as specified in the proposed site plan due to presence of an obstacle in a vicinity of the proposed location.

27. The method as in claim 25, wherein the input is feedback from the installation technician during the installation of the wireless base station in the geographical region, the feedback indicating that deployment of the wireless base station at the proposed location is impracticable due to presence of an RF-blocking obstacle in the geographical region.

28. The method as in claim 25, further comprising:
receiving location information indicating a location of an RF-blocking obstacle in a vicinity of the proposed location, the location information provided by the installation technician based on an in-person survey of the geographical region, the RF-blocking obstacle being an impediment to providing desired wireless coverage in the geographical region to a target location in the geographical region; and
initiating display of a symbol representing the RF-blocking obstacle on the display screen.

29. The method as in claim 28 further comprising:
in view of the location of the RF-blocking obstacle, initiating display of the alternative location in which to install the wireless base station, the alternative location of the wireless base station providing the desired wireless coverage to the target location.

30. The method as in claim 25, wherein the visual indication indicates a continuum on a physical cable resource in the pre-existing network infrastructure on which to selectively attach the wireless base station, the continuum of the physical cable resource including a communication link on which to convey data to the wireless base station and a power supply resource to power the wireless base station.

31. The method as in claim 25 further comprising:
displaying a rendition of the pre-existing network infrastructure on the display screen, the rendition of the pre-existing network infrastructure indicating a proximity of the pre-existing infrastructure in the geographical region; and
displaying the visual indication to indicate a less-than-all portion of the pre-existing network infrastructure, the less-than-all portion of the pre-existing network infrastructure including the identified resources supporting installation of the wireless base station.

32. A method comprising:
  initiating display of a proposed site plan on a display screen, the proposed site plan specifying a proposed location to install a wireless base station in a geographical region;
  during physical installation of the wireless base station in the geographical region, receiving input from an installation technician installing the wireless base station in the geographical region, the input applied with respect to proposed site plan on the display screen, the input indicating a presence and location of at least one obstacle in the geographical region in a vicinity of the proposed location;
  in response to receiving the input, identifying an alternative location in which to install the wireless base station; and
  updating the proposed site plan on the display screen, the updated proposed site plan specifying: i) the alternative location in the geographical region, and ii) a prediction of wireless coverage provided by the wireless base station in the alternative location.

33. The method as in claim 32, wherein the prediction of wireless coverage provided by the wireless base station in the alternative location takes into account RF-blocking affects of the at least one obstacle, the at least one obstacle identified as being present based on an in-person survey of the geographical region by the installation technician, the installation technician presenting the alternative location as an option to install the wireless base station in the geographical region.

34. A system comprising:
  a processor; and
  a hardware storage resource coupled to the processor, the hardware storage resource storing instructions that, when executed by the processor, cause the processor to perform the operations of:
    initiating display of a proposed site plan on a display screen viewed by an installation technician installing a wireless base station in a geographical region, the proposed site plan specifying: i) a proposed location to install the wireless base station in the geographical region, and ii) a prediction of wireless coverage provided by the wireless base station in the proposed location;
    during installation of the wireless base station, receiving input proposing installation of the wireless base station in an alternative location with respect to the proposed location, the input further indicating presence and location of an obstacle in the geographical region in a vicinity of the proposed location; and
    in response to receiving the input, updating the proposed site plan on the display screen, the updated proposed site plan specifying: i) the alternative location in the geographical region, and ii) a prediction of wireless coverage provided by the wireless base station in the alternative location.

35. The system as in claim 34,
  wherein the input is feedback during the installation, the feedback indicating that deployment of the wireless base station at the proposed location is impracticable due to the RF-blocking obstacle.

36. The system as in claim 34, wherein updating the display screen to display the updated proposed site plan includes:
  on the display screen, initiating simultaneous display of the prediction of wireless coverage provided by the wireless base station in the alternative location with respect to the prediction of wireless coverage provided by the wireless base station in the proposed location.

37. The system as in claim 36, wherein updating the display screen to display the updated proposed site plan includes:
  providing a visual indication of a portion of the geographical region in which the prediction of wireless coverage provided by the wireless base station in the alternative location and the prediction of wireless coverage provided by the wireless base station in the proposed location do not overlap.

38. The system as in claim 34, wherein the processor further performs the operations of:
  receiving a command applied to the wireless base station in the proposed site plan displayed on the display screen;
  identifying resources required to operate the wireless base station;
  identifying alternative locations of a network infrastructure in a vicinity of the proposed location that have an ability to support the wireless base station as specified by the required resources; and
  on the updated proposed site plan, providing a visual indication specifying multiple acceptable alternative locations of the network infrastructure having the ability to support wireless base station.

39. The system as in claim 38, wherein the visual indication indicates a continuum on a physical cable resource in the network infrastructure on which to selectively attach the wireless base station, the continuum of the physical cable resource including a communication link on which to convey data to the wireless base station and a power supply resource to power the wireless base station.

40. The system as in claim 34, wherein the processor further performs the operations of:
  receiving location information indicating a location of at least one RF-blocking obstacle in a vicinity of the proposed location; and
  initiating display of multiple acceptable alternative locations in which to install the wireless base station; and
  receiving a selection amongst the multiple acceptable alternative locations.

41. The system as in claim 34, wherein initiating display of the proposed site plan includes overlaying a display of resources in a network infrastructure on the proposed site plan; and
  providing an indication of a location of a resource in the network infrastructure in which to attach the wireless base station.

42. The system as in claim 34, wherein the processor further performs the operations of:
  identifying operational parameters associated with the wireless base station; and
  based on the operational parameters, performing an analysis to determine whether the alternative location has the ability to support operation of the wireless base station in accordance with the operational parameters.

43. Computer-readable storage hardware having instructions stored thereon, the instructions, when carried out by a processor, causes the processor to perform operations of:
  initiating display of a proposed site plan on a display screen, the proposed site plan specifying a proposed location to install a wireless base station in a geographical region;
  during physical installation of the wireless base station in the geographical region, receiving input from an installation technician installing the wireless base station in the geographical region, the input applied with respect to proposed site plan on the display screen, the input indicating a presence and location of at least one obstacle in the geographical region in a vicinity of the proposed location;

in response to receiving the input, identifying an alternative location in which to install the wireless base station; and updating the proposed site plan on the display screen, the updated proposed site plan specifying: i) the alternative location in the geographical region, and ii) a prediction of wireless coverage provided by the wireless base station in the alternative location.

* * * * *